United States Patent
Lin

(10) Patent No.: US 10,291,538 B2
(45) Date of Patent: May 14, 2019

(54) FLOW CONTROL IN CONNECTION WITH AN ACCESS REQUEST

(71) Applicant: Alibaba Group Holding Limited, George Town (KY)

(72) Inventor: Jincheng Lin, Hangzhou (CN)

(73) Assignee: Alibaba Group Holding Limited (KY)

( * ) Notice: Subject to any disclaimer, the term of this patent is extended or adjusted under 35 U.S.C. 154(b) by 50 days.

(21) Appl. No.: 15/461,223

(22) Filed: Mar. 16, 2017

(65) Prior Publication Data

US 2017/0272371 A1   Sep. 21, 2017

(30) Foreign Application Priority Data

Mar. 21, 2016 (CN) .......................... 2016 1 0161957

(51) Int. Cl.
| | |
|---|---|
| *H04L 12/801* | (2013.01) |
| *H04L 12/66* | (2006.01) |
| *H04L 12/851* | (2013.01) |
| *H04L 12/859* | (2013.01) |
| *H04L 29/08* | (2006.01) |
| *H04L 12/825* | (2013.01) |

(52) U.S. Cl.
CPC .............. *H04L 47/29* (2013.01); *H04L 12/66* (2013.01); *H04L 47/2433* (2013.01); *H04L 47/2475* (2013.01); *H04L 47/25* (2013.01); *H04L 67/00* (2013.01)

(58) Field of Classification Search
CPC .. H04L 12/66; H04L 47/2433; H04L 47/2475; H04L 47/25; H04L 47/29; H04L 67/00
See application file for complete search history.

(56) References Cited

U.S. PATENT DOCUMENTS

| | | | |
|---|---|---|---|
| 2008/0002732 A1* | 1/2008 | Tzeng .................... | H04L 47/10 370/412 |
| 2014/0173018 A1* | 6/2014 | Westphal ............ | H04L 41/0823 709/213 |
| 2015/0052250 A1 | 2/2015 | Doganata | |
| 2015/0188797 A1 | 7/2015 | Satat | |
| 2015/0381436 A1 | 12/2015 | Jackson | |
| 2017/0272371 A1* | 9/2017 | Lin ......................... | H04L 12/66 |

* cited by examiner

*Primary Examiner* — Benjamin H Elliott, IV
(74) *Attorney, Agent, or Firm* — Van Pelt, Yi & James LLP

(57) ABSTRACT

Embodiments of the present application relate to a method, device, and system for flow control in connection with one or more access requests. The method includes detecting one or more access requests communicated from one or more access terminals, the one or more access requests associated with accessing a service application system, obtaining flow-limiting condition data, determining a new flow control threshold value based at least in part on the flow-limiting condition data, and updating a current flow control threshold value based at least in part on the new flow control threshold value.

21 Claims, 16 Drawing Sheets

FLOW CONTROL IN CONNECTION WITH AN ACCESS REQUEST

CROSS REFERENCE TO OTHER APPLICATIONS

This application claims priority to People's Republic of China Patent Application No. 201610161957.3 entitled METHOD, DEVICE, AND SYSTEM FOR FLOW CONTROL filed Mar. 21, 2016 which is incorporated herein by reference for all purposes.

FIELD OF THE INVENTION

The present invention relates to a field of network application technology. In particular, the present application relates to a method, a device and a system for flow control of network traffic.

BACKGROUND OF THE INVENTION

In network applications, the method commonly used by the conventional art uses adopting flow control or downgrading measures to resolve the effects on application systems of sudden abnormal traffic. For example, the conventional art can multi-dimensionally restrict client visitor requests via gateways to achieve the flow-control objective. Examples of restricting client visitor requests include restricting the number of visits per minute by each client IP, restricting the number of visits per minute by an API, or restricting the visit frequency of a user with regard to an Application Programming Interface (API).

According to conventional art, a flow control method generally uses a static flow-limiting strategy. For example, the conventional art uses direct configuration by a configuration system or configuration file. The conventional art uses fixed, invariable flow-limiting rules for flow control.

FIG. 1 is a system architecture diagram of a flow control system according to conventional art.

Referring to FIG. 1, system 100 for controlling flow of network traffic is provided. System 100 comprises client 102, gateway 104, application system 106, and storage for flow control rules 108.

As illustrated in FIG. 1, at step A, client 102 issues access requests to a gateway 104. At step B, gateway 104 acquires preconfigured flow control rules from storage for flow control rules 108. At step C, gateway 104 uses the preconfigured flow control rules to exercise flow-limiting control (e.g., over client 102). The gateway can exercise flow-limiting control by sending an error code (e.g., 'Please try again later,' etc.) to the client, or otherwise restricts the request. At step D, gateway 104 sends the access requests that were subjected to flow-limiting control to application system 106.

However, the system architecture of the conventional art can cause inefficiencies in connection with the control of the flow of network traffic. For example, system response times can be increased as a result of an API in a certain zone developing a problem or the internal stress of an access application program. In the case of the above, if flow continues to be limited according to the original fixed flow-limiting strategy, and if there is a large volume of access requests, the accessed application system may crash as a consequence of the above.

No effective solution has been put forward yet to address the technical problem of the conventional art, namely that the flow-limiting strategy is a fixed flow-limiting strategy that, in certain circumstances, causes a mismatch between the fixed flow-limiting strategy and the operating status of the business system, which in turn causes the business system to crash.

BRIEF DESCRIPTION OF THE DRAWINGS

Various embodiments of the invention are disclosed in the following detailed description and the accompanying drawings.

DETAILED DESCRIPTION

Figure 1:
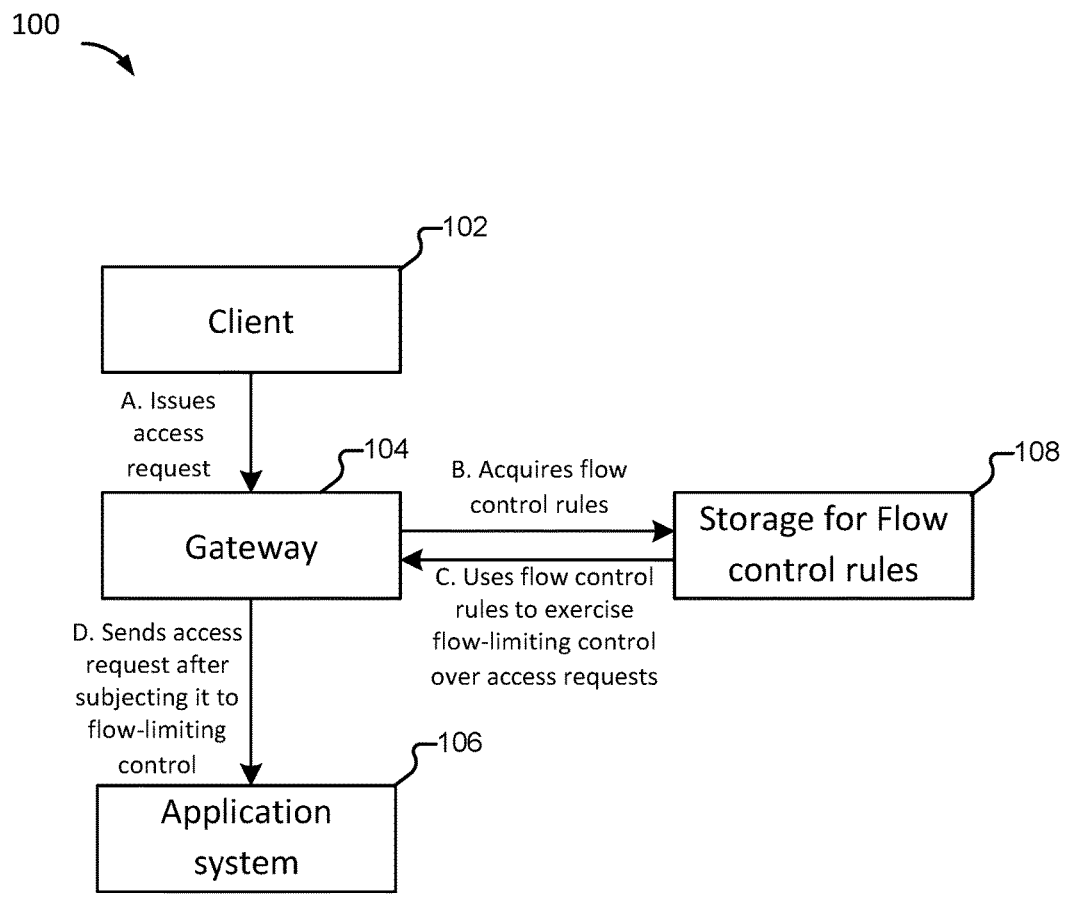
FIG. 1 is a system architecture diagram of a flow control system according to conventional art.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

According to various embodiments, an Application Programming Interface (API) corresponds to a set of predefined functions that provides application programs and developers with the ability to access a set of routines based on certain software or hardware without having to access the source code.

According to various embodiments, a logging system is a system that records hard drive, software, and system problem information. For example, the logging system can monitor the causes for system problems.

As used herein, a terminal generally refers to a device used (e.g., by a user) within a network system and used to communicate with one or more servers. According to various embodiments of the present disclosure, a terminal includes components that support communication functionality. For example, a terminal can be a smart phone, a tablet device, a mobile phone, a video phone, an e-book reader, a desktop computer, a laptop computer, a netbook computer, a personal computer, a Personal Digital Assistant (PDA), a Portable Multimedia Player (PMP), an mp3 player, a mobile medical device, a camera, a wearable device (e.g., a Head-Mounted Device (HMD), electronic clothes, electronic braces, an electronic necklace, an electronic accessory, an electronic tattoo, or a smart watch), a smart home appliance, vehicle-mounted mobile stations, or the like. A terminal can run various operating systems.

A terminal can have various input modules. For example, a terminal can have a touchscreen, one or more sensors, a microphone via which sound input (e.g., speech of a user) can be input, a camera, a mouse, or other external input devices connected thereto, etc.

As used herein, a smart terminal refers to terminal devices that have multimedia functions. Smart terminals can correspond to devices that support audio, video, data, and/or other functions. In some embodiments, a smart terminal has a touchscreen. Smart terminals can include mobile terminals such as smartphones, table computers, and smart wearable devices. Smart terminals can be a smart television, a personal computer, or another device with a touchscreen.

According to various embodiments, a flow control method for controlling the flow of network traffic is provided. The steps depicted in the flowcharts in the drawings can be executed in a computer system, such as a group of computers capable of executing commands. Moreover, although logical sequences are depicted in the flowcharts, the steps that are depicted or described may, in some situations, be executed in sequences other than those here.

The method of controlling flow may be executed on a mobile terminal, a computer terminal, or similar operating device.

Figure 2:
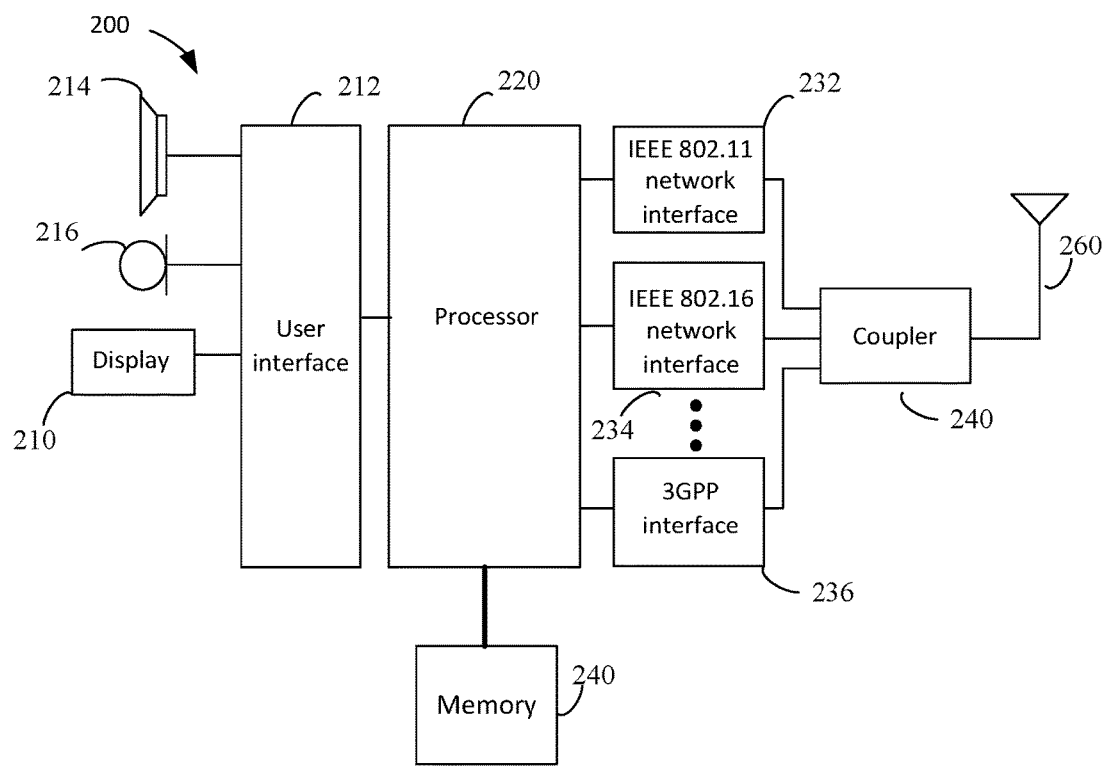
FIG. 2 is a block diagram of a terminal for flow control according to various embodiments of the present application.

FIG. 2 is a block diagram of a terminal for flow control according to various embodiments of the present application.

Referring to FIG. 2, terminal 200 configured for flow control is provided. Terminal 200 comprises processor 220, memory 240, and transmission module 260. Terminal 200 can further include display 210, user interface 212, speaker 214, and microphone 216. Terminal 200 can include network interfaces 232, 234, and 236, and a coupler 240 that couples the network interfaces 232, 234, and 236 with the transmission module 260. Terminal 200 can implement process 300 of FIG. 3A, process 350 of FIG. 3B, process 400 of FIG. 4, process 500 of FIG. 5A, process 550 of FIG. 5B, and/or process 600 of FIG. 6.

Processor 220 may include but is not limited to processing devices such as microprocessors (MCUs) or programmable logic device FPGAs. Memory 240 is configured to store data, and a transmission module 260 is configured for communication functions.

In some embodiments, memory 240 stores application programs and modules of application software. As an example, application software includes a program instruction/module corresponding to a control of data flow such as process 300 of FIG. 3A, process 350 of FIG. 3B, process 400 of FIG. 4, process 500 of FIG. 5A, process 550 of FIG. 5B, and/or process 600 of FIG. 6. Processor 220 can execute various function applications and data processing by running software programs and modules stored in memory 240. Memory 240 can comprise high-speed random access memory, non-volatile memory, such as one or more magnetic storage devices, flash memory, and/or other non-volatile solid-state memory. In some embodiments, memory 240 may further comprise memory that is remotely disposed relative to processor 220. Such remote memory can be connected to terminal 200 via a network. Examples of the aforesaid network comprise but are not limited to the Internet, corporate intranets, local area networks, mobile communication networks, and combinations thereof.

Transmission module 260 is configured to receive and/or send data via a network. Specific examples of the aforesaid network may comprise wireless networks provided by communication suppliers for terminal 200. In various embodiments, transmission module 260 comprises a network interface controller (NIC), which can connect to other networks and thereby communicate with the Internet.

Figure 3A:
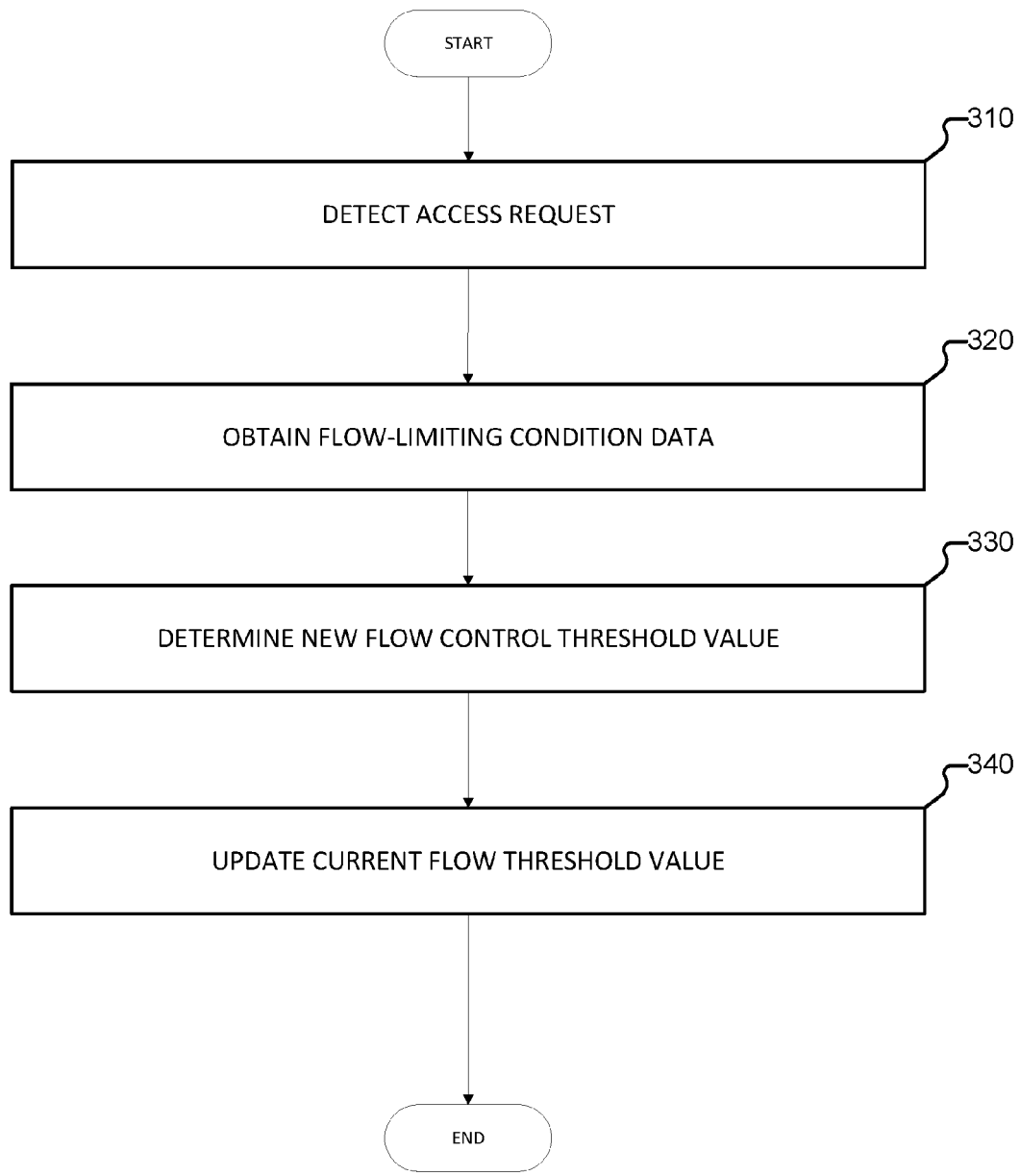
FIG. 3A is a flowchart of a flow control method according to various embodiments of the present application.

FIG. 3A is a flowchart of a flow control method according to various embodiments of the present application.

Referring to FIG. 3A, process 300 for controlling flow of data is provided. Process 300 can be implemented by a terminal such as a gateway or by a system such as system 100 of FIG. 1 (e.g., by gateway 104 or application system 106 of system 100 of FIG. 1). Process 300 can be implemented by a computing system such as system 1300 of FIG. 13 or computer system 1400 of FIG. 14. Process 300 can implement process 350 of FIG. 3B. Process 300 can implement process 400 of FIG. 4. Process 300 can implement process 500 of FIG. 5A. Process 300 can implement process 550 of FIG. 5B.

At 310, an access request is detected. A terminal (e.g., a network gateway) can receive the access request sent by access terminals. The access terminals can be a terminal or client used by a customer or an end user. The terminal that detects the access request can be a gateway or other device. In some embodiments, the access request sent by the access terminals corresponds to a request for accessing a service application system (e.g., an application system that can provide a service such as a software as a service, a transaction system, etc.). The application system or service system can be a business system. In some embodiments, the application system or service system can run on a plurality of servers (e.g., production servers). The access terminals can send the access request to the terminal via a network. In some embodiments, each access terminal attempting to access the service application system (e.g., the business system) sends a corresponding access request to the terminal.

At 320, flow-limiting condition data is obtained. The terminal can obtain the flow-limiting condition data in response to detecting or receiving the access request. For example, the terminal can obtain the current flow-limiting condition data in response to detecting of receiving the access request. The flow-limiting condition data can be obtained in connection with implementing process 400 of FIG. 4. For example, 320 can implement process 400 of FIG. 4. The flow-limiting condition can be obtained from a data store in a file system (e.g., a Store in FileSystem such as mysql database, or another database).

In some embodiments, 310 and 320 can be performed as one step or contemporaneously.

In some embodiments, the access terminals correspond to terminals that access a service application system (e.g., the business system) through a network. Examples of access terminals include smartphones, tablets, computers, and other terminal devices.

In some embodiments, the service application system (e.g., the business system) corresponds to business services provided by a server that are accessed by a terminal (e.g., an access terminal) via a network such as the Internet. The service application system (e.g., the business system) can be software as a service (SaaS). Examples of the service application system (e.g., the business system) include an ordering system and a logistics system. An ordering system can be a system for processing (e.g., receiving, managing, fulfilling, etc.) online orders. A logistics system can be a system for processing delivery (e.g., receiving a delivery request, managing delivery resources for fulfilling delivery, tracking delivery, etc.) of an item (e.g., an order).

Figure 4:
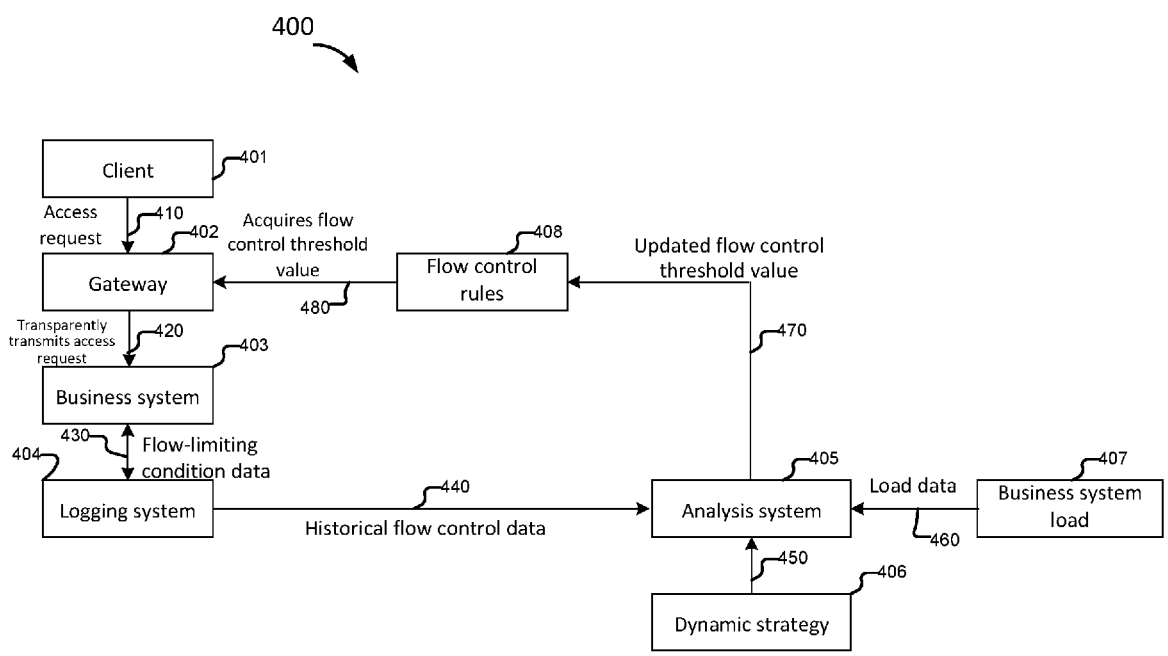
FIG. 4 is a diagram of a flow control method according to various embodiments of the present application.

FIG. 4 is a diagram of a flow control method according to various embodiments of the present application.

Referring to FIG. 4, process 400 for controlling flow of data is provided. Process 400 can be implemented by a terminal or by a system such as system 100 of FIG. 1 (e.g., by gateway 104 or application system 106 of system 100 of FIG. 1), a gateway, an analysis system, a network device or the like. Process 400 can be implemented by a computing system such as system 1300 of FIG. 13 or computer system 1400 of FIG. 14. Process 400 can be implemented in connection with process 300 of FIG. 3A, process 350 of FIG. 3B, process 500 of FIG. 5A, and/or process 550 of FIG. 5B.

According to various embodiments, in the event that one or more access requests issued by the access terminals for accessing the service application system (e.g., the business system) are detected, the flow-limiting condition data (e.g., the current flow-limiting condition data) is obtained using the service application system (e.g., the business system) illustrated in FIG. 4. According to various embodiments, analysis system 405 is an independent server/computer or coupled with application software in another server/computer. Access terminals can correspond to client 401 and can have app functions (e.g., the ability to execute app functions provided by apps installed thereon). At 410, client 401 (e.g., the access terminal(s)) transparently sends the access requests via a gateway 402 to service application system (e.g., business system) 403. In some embodiments, client 401 can send the access request to gateway 402 and gateway 402 can receive the access request, dispatch the access request and send a new request to a backend application server (e.g., to the service application system 403). At 420, gateway 402 forwards the access requests to service application system (e.g., business system) 403. The access requests are forwarded via the service application system (e.g., business system), and optionally recorded by a logging system 404, to analysis system 405.

In some embodiments, in the event that client 401 sends (e.g., issues) an access request to gateway 402, gateway 402 can obtain (e.g., acquire) the current flow control threshold value from existing flow control rules. For example, gateway 402 can obtain the existing flow control rules from a memory or a storage storing flow control rules 408. Gateway 402 can obtain the existing flow control rules via an API associated with a storage system. The memory or storage storing flow control rules 408 can be remote to the gateway 402, or co-located at gateway 402. Gateway 402 can use the current flow control threshold value to exercise flow-limiting control over the access request. For example, gateway 402 can control the flow for data associated with the access request (e.g., data that is in response to the access request), based at least in part on the current flow control threshold value. In the event that the access request is successfully sent to service application system (e.g., business system) 403 via gateway 402, analysis system 405 can successfully detect the access request sent by client 401 (e.g., the access terminal) and thus trigger the obtaining (e.g., acquisition) of flow-limiting condition data. The flow limiting condition data can be obtained from a request log (e.g., associated with access requests)

In some embodiments, analysis system 405 obtains the flow-limiting condition data based at least in part on one or more of historical flow control data, service application system (e.g., business system) load 407, and dynamic strategy 406. Service application system (e.g., business system) load 407 can correspond to information associated with the current load of the service application system (e.g., business system) such as a measure of resources currently or estimated to be used by service application system (e.g., business system) 403 (e.g., CPU cycles, amount of memory used, number of connections, etc.). Service application system (e.g., business system) load 407 can also be associated with an estimated load required to process the access request. Dynamic strategy 406 can be based on one or more rules for performing executing the service application system (e.g., business system) 403. Dynamic strategy 406 can include one or more configurations or modules for service application system (e.g., business system) 403. Dynamic strategy 406 can include one or more policies associated with managing the flow control such as a policy to adjust one or more flow-control rules. For example, dynamic strategy 406 can set one or more thresholds associated with the managing of the flow control.

In some embodiments, analysis system 405 determines (e.g., computes) the flow-limiting condition data using one or more of historical control data (e.g., obtained from logging system 404), service application system (e.g., business system) load 407, and dynamic strategy 406.

At 430, service application system (e.g., business system) 403 and logging system 404 communicate flow-limiting condition data there between.

At 440, analysis system 405 receives historical flow control data. In this example, analysis system 405 obtains the historical flow control data from logging system 404.

At 450, analysis system 405 receives dynamic strategy 406.

At 460, analysis system 405 receives load data corresponding to service application system (e.g., business system) load 407.

At 470, analysis system 405 computes an updated flow control value and communicates the updated control threshold value. In some embodiments, analysis system 405 computes the updated flow control value based at least in part on one or more of historical flow control data, service application system (e.g., business system) load 407, and dynamic strategy 406. Analysis system 405 can send the updated flow control threshold value to a memory for flow control rules 408. For example, the flow control rules stored in the memory can be updated for flow control rules 408.

At 480, gateway 402 obtains the flow control threshold value. Gateway 402 can obtain the flow control threshold value from the memory for flow control rules 408. In some embodiments, the gateway 402 obtains the updated flow control threshold value.

Returning to FIG. 3A, at 330, a new flow control threshold value is determined. The new flow control threshold can be determined according to the flow-limiting condition data. In some embodiments, the new flow control threshold is determined by the gateway. In some embodiments, the new flow control threshold is determined by the analysis system. The analysis system can determine the new flow control threshold according to the flow-limiting condition data. The analysis system can be analysis system 405 of FIG. 4.

The flow control threshold value can be used to represent the maximum access value permitted by the gateway. For example, in the event that the access value for a terminal accessing the target service application system (e.g., business system) exceeds the flow control threshold value, the gateway prohibits continued access by the access terminal of the target service application system (e.g., business system). According to various embodiments, the access value can be the number of times the terminal accesses the target service application system (e.g., business system) within a preset period of time, the frequency with which the terminal accesses the target service application system (e.g., business system), the number of times or frequency that a fixed IP address accesses the service application system (e.g., business system), and the number of times or frequency that an API accesses the service application system (e.g., business system), and/or any other appropriate values.

According to various embodiments, because the flow-limiting condition data is dynamic data that changes over time, the new flow control threshold value is also dynamic data.

As shown in FIG. 4, in some embodiments, a new flow control threshold value can be obtained through the analysis system. The new flow control threshold value can be a flow control threshold value obtained by changing (e.g., raising or lowering) the current flow control threshold value. The analysis system updates the new flow control threshold value so that it is in the current flow control rules. For example, the current flow control rules can be updated to include the new flow control threshold value. In some embodiments, the new flow control threshold value can replace an existing flow control threshold value (e.g., the current flow control threshold value).

Referring again to FIG. 3, at 340, the current flow threshold value is updated. The current flow threshold value can be updated according to the new flow control threshold value. In some embodiments, the current flow threshold value is updated by the analysis system. In some embodiments, the current flow threshold value is updated by the gateway. For example, an entry corresponding to the current flow threshold value stored in a database can be updated.

In some embodiments, a service application system (e.g., business system) corresponds to an ordering system. When a user sends (e.g., using a terminal) an access request via a gateway to the target ordering system, an analysis system uses the acquired flow-limiting condition data as a basis for determining that the internal operating stress in the current ordering system is excessive and that the flow control threshold value is to be lowered in order to prevent excessive access requests from causing the ordering system to crash. The analysis system obtains the new flow control threshold value. In response to the analysis system obtaining the new flow control threshold value, a lower new flow control threshold value replaces the current flow control threshold value. The gateway equipment uses the new flow control threshold value to impose a flow limit on user access. For example, the analysis system can provide the new flow control threshold value to the gateway. As another example, the gateway can obtain the current flow control threshold value which can correspond to the new flow control threshold value upon the new flow control threshold value replacing the current flow control threshold value. In some embodiments, traffic flow associated with accessing the service application system is controlled based at least in part on the current flow control threshold value. For example, one or more access requests (e.g., subsequent to the current flow threshold value being updated based on the new flow control threshold value) can be queued or denied. In some embodiments, the gateway equipment can queue or deny the access requests. In some embodiments, traffic flow associated with accessing the service application system is controlled according to whether a traffic measurement has reached the current flow control threshold value (e.g., that has been updated with the new flow control threshold value).

In some embodiments, because the new flow control threshold value is determined by the analysis system according to flow-limiting condition data, and because the current flow control threshold value is replaced by the new flow control threshold value, the flow control threshold value determined using the scheme described above is a dynamic flow control threshold value that varies according to flow-limiting condition data.

Because flow-limiting condition data can include the current flow control threshold value, the new flow control threshold value obtained according to the flow-limiting condition data is the flow control threshold value corresponding to the current flow-limiting condition data. The dynamic new flow control threshold value can be considered as capable of self-adjusting based on the current flow-limiting condition data. For example, in some embodiments, the dynamic new flow control threshold value has a relationship with the current flow-limiting condition data (e.g., the new flow control threshold value iteratively feedsback into the flow limiting condition data).

According to various embodiments, in the event that the operating status of the service application system (e.g., business system) undergoes a change (e.g., an API develops a fault or the operating stress of the service application system becomes excessive) or a terminal abnormally accesses the service application system (e.g., business system), a new flow threshold value can be obtained. For example, the analysis system can adjust the flow control threshold value according to the change in the flow-limiting condition data and thus obtains a new flow control threshold value. The gateway uses the new flow control threshold value to impose flow limits on the access requests received from the terminal. Because the new flow control threshold value is compatible with the operating status of the service application system (e.g., the business system operating status is embodied in the flow-limiting condition data because the new flow control threshold values is chosen such that the business system should operate normally), the new flow control threshold value is also a flow control threshold value compatible with the current operating status of the service application system (e.g., business system). The business system operating status can be embodied in the flow-limiting condition data because the business system operating data causes changes in the future flow control threshold values which are a component of the flow-limiting condition data. The new flow control threshold values can be chosen such that the business system should operate normally because a request handle will exceed the resource of server, and as a result, reducing the request number will decrease stress of the server. The new flow control threshold value can also be a flow control threshold value compatible with the current operating status of the service application system (e.g., business system) because the flow control threshold value can be based on the running status (e.g., operating status) of a server. The running status of the server can include a load or CPU stress, etc. Accordingly, the compatibility between the new flow control threshold value and the operating status of the current service application system (e.g., business system) avoids the problem associated with the operating status of the service application system (e.g., business system) being in a variable state, but the flow control threshold value being a flow control threshold value resulting from a fixed threshold value and thus potentially incompatible with the operating status of the service application system (e.g., business system). Incompatibility between the service application system (e.g., business system) operating status and the flow control threshold value can result in system crashes; accordingly, some embodiments having the compatibility between the new flow control threshold value and the operating status of the current service application system (e.g., business system) avoid the system crash problem.

Various embodiments solve the technical problem of the prior art associated with the flow-limiting strategy being a fixed flow-limiting strategy that, in certain circumstances, causes a mismatch between the fixed flow-limiting strategy and the operating status of the service application system (e.g., business system), which in turn causes the service application system (e.g., business system) to crash.

In various embodiments, the flow-limiting condition data comprises the current flow control threshold value. In some embodiments, the flow-limiting condition data further comprises historical flow control data, service application system (e.g., business system) load data, or a combination thereof.

In some embodiments, the new flow control threshold value can be obtained from either historical flow control data or service application system (e.g., business system) load data. In some embodiments, the new flow control threshold value can be obtained from two-dimensional flow-limiting condition data that includes both historical flow control data and service application system (e.g., business system) load data, thus taking into account both service application system (e.g., business system) historical flow control conditions and service application system (e.g., business system) load conditions and enabling the analysis system (or other device that obtains or determines the new flow control threshold) to obtain a further new flow control threshold value based on historical flow control data and enabling the analysis system to acquire the further new flow control threshold value corresponding to service application system (e.g., business system) load conditions. As an example, the new flow control threshold value can be determined according to a two-factor determination based on (i) historical flow control conditions, and (ii) current load conditions of the service application system (e.g., an application server).

In some embodiments, the historical flow control data comprises a flow-limiting count, a flow-limiting frequency, or a combination thereof. The load data can comprise a task processing value (e.g., number of tasks processed in a certain amount of time) or CPU utilization ratio (e.g., percentage of CPU that is in use in a certain amount of time). For example, with respect to the CPU utilization ratio, if the CPU utilization capacity corresponds to 3600 seconds, and the work occupies occupy 1800 seconds, the CPU utilization is 50%. The CPU utilization ration can be provided by the operating system. As an example with respect to the task processing value, a thread or task is processed one by one in queue by a CPU; if the CPU is busy, then the thread or task will stay in queue. If the queue is large, then the load will increase which can affect to a load processing value. The load processing value can be provided by an operating system.

In some embodiments, the analysis system collects logs from the logging system to obtain the historical flow control data in the aforesaid flow-limiting condition data. The analysis system can collect logs from the logging system to obtain the historical flow control data in association with accessing the current application system loads in connection with acquiring the business load data for various business systems. For example, the analysis system may access logs from the logging system and the current application system loads in connection with determining a new flow control threshold value.

In some embodiments, the flow-limiting count and/or flow-limiting frequency included in the historical flow control data can correspond to the count to which a terminal has been flow-limited, the frequency to which a terminal has been flow-limited within a preset period of time, or the combination thereof. A service application system (e.g., business system) can comprise a business service cluster. As an example, the business service cluster can be a server cluster comprised of multiple servers running in the service application system (e.g., business system). The multiple servers can be configured to simultaneously process the access requests (e.g., received from one or more terminals) for a service application system (e.g., business system).

The task processing value can indicate the task identifiers of tasks currently being executed by the service application system (e.g., business system). The task value can correspond to a task to be executed by the service application system. The task processing value can correspond to a value of tasks that can be handled by the service application system.

The CPU utilization ratio can indicate the CPU resources occupied by programs currently running on the service application system (e.g., business system). The CPU utilization value can be positively correlated with the amount of resources already occupied by the CPU and inversely related to the amount of resources available for continued processing of an (incoming or new) access request. For example, the higher the CPU utilization ratio, the greater (it can be assumed) the amount of resources already occupied by the CPU, and the smaller the amount of resources available for continued processing of access requests.

In some embodiments, the flow control threshold value corresponds to one or more of a user flow control threshold value corresponding to a threshold amount of flow coming from a user (e.g., 10 simultaneous connections from a specific user), an access terminal address flow control threshold value corresponding to a threshold amount of flow originating from an access terminal address (e.g., 1 MB of data from a specific access terminal address), an API flow control threshold value corresponding to a threshold amount of flow associated with a particular API (e.g., 5 calls for a specific API within 10 minutes), any other appropriate threshold values, or a combination thereof. The user flow control threshold value can correspond to a threshold number of requests that can be received from a user (e.g., within a predefined period of time, etc.). The access terminal address flow control threshold value can correspond to a threshold number of requests that can be received from an IP address or another identifier corresponding to an access terminal (e.g., within a predefined period of time, etc.). The API flow control threshold value can correspond to a threshold number of requests that can be received via a particular API (e.g., any one API) (within a predefined period of time, etc.).

Figure 5A:
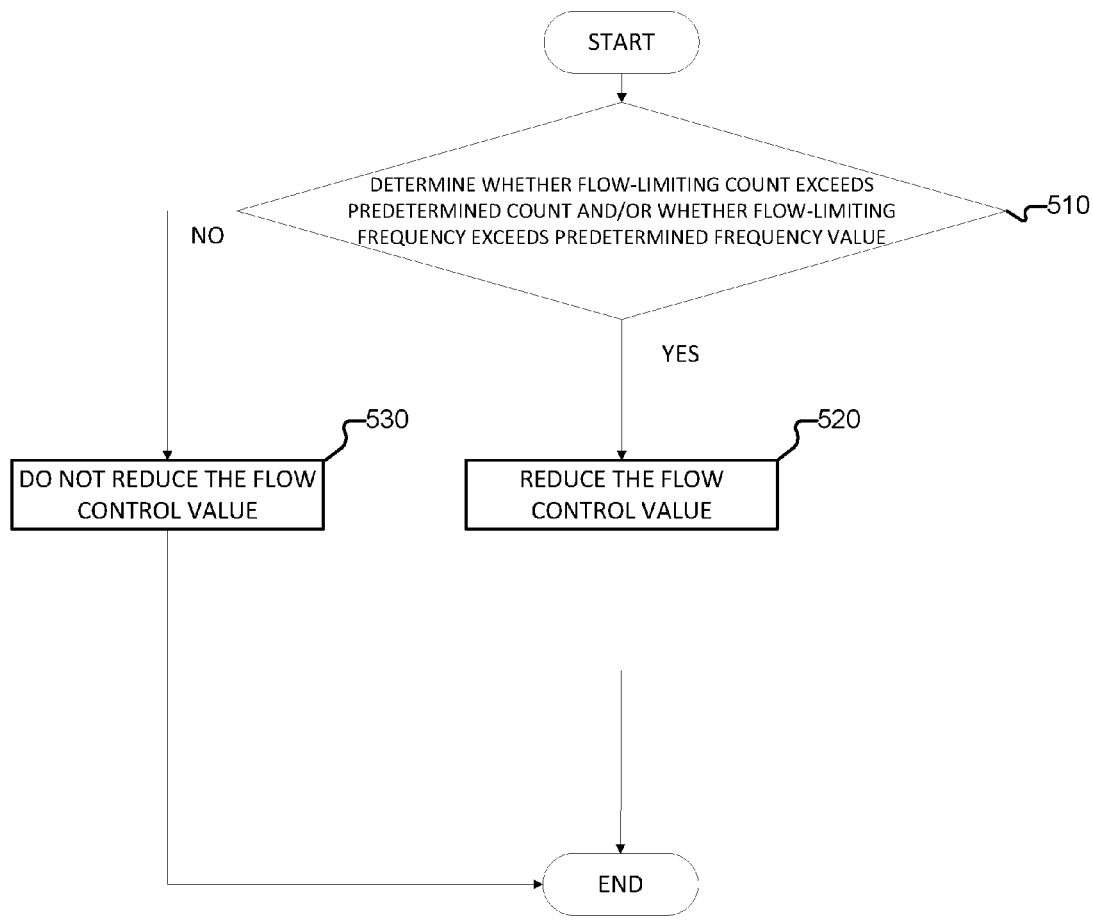
FIG. 5A is a diagram of a flow control method according to various embodiments of the present application.

FIG. 5A is a diagram of a flow control method according to various embodiments of the present application.

Referring to FIG. 5A, process 500 for controlling flow of data is provided. Process 500 can be implemented by a terminal or by a system such as system 100 of FIG. 1 (e.g., by gateway 104 or application system 106 of system 100 of FIG. 1), a gateway, an analysis system, a network device, or the like. Process 500 can be implemented by a computing system such as system 1300 of FIG. 13 or computer system 1400 of FIG. 14. Process 500 can be implemented in connection with process 300 of FIG. 3A, process 350 of FIG. 3B, and/or process 400 of FIG. 4. In some embodiments, process 500 can be implemented in connection with 330 of process 300. For example, 330 of process 300 can comprise process 500.

At 510, it is determined whether one or more flow-limiting measurements or values exceeds one or more flow-limiting thresholds. For example, it can be determined whether the flow-limiting count exceeds a predetermined count and/or the flow-limiting frequency exceeds a predetermined frequency value. For example, it can be determined whether the one or more of the flow-limiting count and the flow-limiting frequency exceeds a corresponding threshold value.

In the event that the one or more flow-limiting measurements or values does not exceed the one or more flow-limiting thresholds, then process 500 proceeds to 520 at which the flow control value is modified. In the event that the flow-limiting count exceeds the predetermined count, and/or the flow-limiting frequency exceeds the predetermined frequency value, process 500 proceeds to 520 at which the flow control threshold value is reduced. In some embodiments, in the event that the flow-limiting count exceeds the predetermined count, and/or the flow-limiting frequency exceeds the predetermined frequency value, the flow control threshold value is lowered to a first predetermined flow control threshold value.

In some embodiments, in the event that the one or more flow-limiting measurements or values do not exceed the one or more flow-limiting thresholds, then process 500 ends. In some embodiments, in the event that the flow-limiting count does not exceed the predetermined count and the flow-limiting frequency does not exceed the predetermined frequency value, then process 500 ends. In some embodiments, in the event that the one or more flow-limiting measurements or values do not exceed the one or more flow-limiting thresholds, then process 500 proceeds to 530 at which the flow control value is not modified. For example, in the event that the flow-limiting count does not exceed the predetermined count and the flow-limiting frequency does not exceed the predetermined frequency value, then process 500 proceeds to 530 at which the flow control value is not reduced.

In some embodiments, the access user flow control threshold value corresponds to the access frequency or the access count of users with regard to a fixed service application system (e.g., business system). In some embodiments, an access terminal address flow control threshold value corresponds to the access frequency or access count of an access terminal address with regard to a fixed service application system (e.g., business system). In some embodiments, the API flow control threshold value could be the access frequency or access count of an API with regard to a fixed service application system (e.g., business system).

Taking as an example a case in which a predetermined count corresponds to 1,000 visits, a flow-limiting frequency of 20 visits/second (e.g., a predetermined frequency value equal to 20 visits/second), and a flow control threshold value that is the access user flow control threshold value, the number of visits the access users make to a service application system (e.g., business system) (e.g., the access count of users) in excess of the flow control threshold value is 1,243, and the average number of visits per second (e.g., the access frequency of the user) in excess of the flow control threshold value is 17.3. Therefore, the access users' flow control threshold value exceeds the predetermined count. In the example described above, the current flow control threshold value is lowered to a first predetermined flow control threshold value to limit access requests by the aforesaid access users. For example, the gateway can delay or refuse to service additional access requests once the number of access requests exceeds the current flow control threshold. The gateway can send a message to the client indicating that the access request will not be processed or another error message. The message sent to the client can request the user to try again at a later time.

According to process 500, both the flow-limiting count and the flow-limiting frequency are assessment conditions. For example, if either the flow-limiting count or the flow-limiting frequency exceeds the corresponding preset value, the flow control threshold value will be lowered.

In some embodiments, the flow-limiting count is assessed to determine whether the flow control threshold value should be lowered in order to resolve the following scenarios. If an access user, an access terminal, or an API is flow-limited on multiple occasions, then that access user, access terminal, or API is subjecting the service application system (e.g., business system) that it is accessing to relatively great access pressure, and the aforesaid access can be deemed to be a malicious access. To prevent the aforesaid access user, access terminal, or API from continuing to make high-frequency normal visits or malicious visits to the service application system (e.g., business system), the analysis system will lower the new flow control threshold value from the current flow control threshold value in order to achieve the technical result of further flow limiting.

In some embodiments, the service application system (e.g., business system) comprises multiple business servers, and the load data of each business server (or more than one of the multiple business servers) is updated in real time.

Figure 5B:
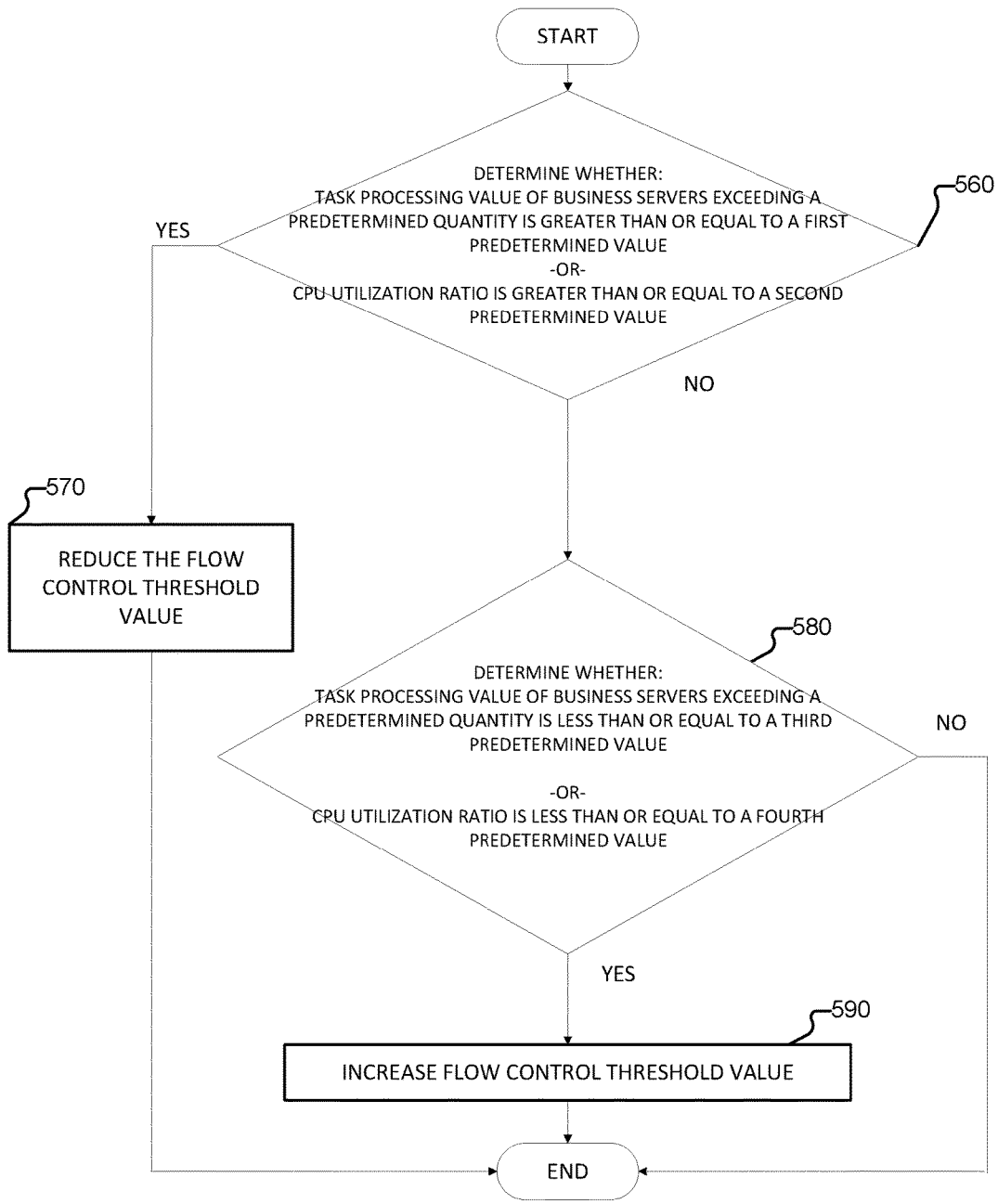
FIG. 5B is a diagram of a flow control method according to various embodiments of the present application.

FIG. 5B is a diagram of a flow control method according to various embodiments of the present application.

Referring to FIG. 5B, process 550 for controlling flow of data is provided. Process 550 can be implemented by a terminal or by a system such as system 100 of FIG. 1 (e.g., by gateway 104 or application system 106 of system 100 of FIG. 1), a gateway, an analysis system, a network device or the like. Process 550 can be implemented by a computing system such as system 1300 of FIG. 13, or computer system 1400 of FIG. 14. Process 550 can be implemented in connection with process 300 of FIG. 3A, process 350 of FIG. 3B, and/or process 400 of FIG. 4. In some embodiments, process 550 can be implemented in connection with 330 of process 300. For example, 330 of process 300 can comprise process 550.

At 560, it is determined whether the task processing value of business servers exceeding a predetermined quantity within the service application system (e.g., business system) is greater than or equal to a first predetermined value, or if the CPU utilization ratio is greater than or equal to a second predetermined value.

In the event that the task processing value of business servers exceeding a predetermined quantity within the service application system (e.g., business system) is determined to be greater than or equal to a first predetermined value, and/or the CPU utilization ratio is determined to be greater than or equal to a second predetermined value, then process 550 proceeds to 570 at which the flow control threshold value is reduced. For example, the flow control threshold value can be lowered to a second predetermined flow control threshold value.

In the event that the task processing value of business servers exceeding a predetermined quantity within the service application system (e.g., business system) is determined to not be greater than or equal to a first predetermined value, and/or the CPU utilization ratio is determined to not be greater than or equal to a second predetermined value, then process 550 proceeds to 580 at which it is determined whether the task processing value of business servers exceeding a predetermined quantity within the service application system (e.g., business system) is less than or equal to a third predetermined value, and/or whether the CPU utilization ratio is less than or equal to a fourth predetermined value.

In the event that the task processing value of business servers exceeding a predetermined quantity within the service application system (e.g., business system) is determined to be less than or equal to a third predetermined value, and/or the CPU utilization ratio is determined to be less than or equal to a fourth predetermined value, then process 550 proceeds to 590 at which the threshold value is increased. For example, the flow control threshold value is increased to a third predetermined flow control threshold value.

In the event that the task processing value of business servers exceeding a predetermined quantity within the service application system (e.g., business system) is determined to be not less than or equal to a third predetermined value, and/or the CPU utilization ratio is determined to be not less than or equal to a fourth predetermined value, then process 550 can end.

In some embodiments, the first predetermined value corresponds to the processing value for relatively large tasks (e.g., four or more) that business processors can process while running normally. A relatively large task can be determined according to a CPU core associated with the business processors. The second predetermined value can correspond to a relatively large CPU utilization ratio (e.g., 100% utilization, or a value greater than 89% utilization) that CPUs can use while running normally. The selection of what values are relatively large depends on implementation and can be empirically determined in some embodiments. Therefore, if the task processing value of business servers exceeding a predetermined quantity within the service application system (e.g., business system) is greater than or equal to a first predetermined value, or the CPU utilization ratio is greater than or equal to a second predetermined value, and if the current flow control threshold value continues to be used, then some business servers or CPUs will experience fault or crash events even if some business servers or CPUs are running overloaded.

In some embodiments, the third predetermined value corresponds to the task processing value when the business servers are relatively idle (e.g., 0.5 or less). The fourth predetermined value can correspond to the CPU utilization ratio when the CPUs are relatively idle (e.g., 50% utilization or less). In some embodiments, the CPUs are deemed to be relatively idle if the CPU utilization ratio is 30% or less. The selection of what values are relatively idle depends on implementation and can be empirically determined in some embodiments. As an example, if the task processing value of business servers exceeding a predetermined quantity within the service application system (e.g., business system) is less than or equal to a third predetermined value, or the CPU utilization ratio is less than or equal to a fourth predetermined value, the business processor cluster or CPUs may be regarded as relatively idle. If the current flow control threshold value is still used to impose flow limits, then a certain amount of resources will be wasted. The business servers or CPUs are running in a relatively idle state, but the users, addresses, or APIs that are accessing the service application system (e.g., business system) via a gateway are all unable to access the service application system (e.g., business system). Therefore, the analysis system raises the flow control threshold value according to the aforesaid flow-limiting condition data in order to enable other users, addresses, or APIs to access the service application system (e.g., business system) as soon as possible. For example, other users, addresses, or APIs are enabled to access the service application system (e.g., business system) by freeing resources for such other users, addresses, or APIs.

According to various embodiments, the analysis system acquires a dynamic flow control strategy. The dynamic flow control strategy can be stored in a database. The dynamic flow control strategy can comprise a method of obtaining new flow control data according to currently available historical flow control data and/or service application system (e.g., business system) load data, or according to preset new flow control threshold values corresponding to historical flow control data and/or service application system (e.g., business system) load data. Using 4-core 4G business servers as an illustrative example, and assuming that the first predetermined value is 4, the second predetermined value is 90%, the third predetermined value is 0.5, and the fourth predetermined value is 50%: if more than 50% of the business servers experience load>4 or the CPU utilization ratio of the 4 core 4G business servers>90% per core, the new flow control threshold value is lowered 10% from the current flow control threshold value (e.g., to the second predetermined flow control threshold value). If more than 50% of the business servers experience load<0.5 or the CPU utilization ratio of the 4 core 4G business servers<50%, then the new flow control threshold value is raised 10% from the current threshold value (e.g., to the third predetermined flow control threshold value). The load can be determined based on a ratio of a number of tasks that the business system is processing and/or to be processed to the number of tasks that the business system can process.

In embodiments, the analysis system obtains historical flow data and service application system (e.g., business system) load data and uses such obtained historical flow data and service application system (e.g., business system) load data as a basis for making dynamic adjustments to the flow control strategy set within flow control rules.

As an illustrative example, the first predetermined value is 20,000, the second predetermined value is 85%, the third predetermined value is 8,000, and the fourth predetermined value is 50%. If 12 of 20 business servers in a service application system (e.g., business system) have a task processing value greater than 200,000, and the CPU utilization ratio is 83%, a new flow control threshold value is set (e.g., by the analysis system) to be less than the current flow control threshold value (e.g., because the task processing value exceeds the first predetermined value). If 3 of 20 business servers in a service application system (e.g., business system) have a task process value less than 8,000, and the CPU utilization ratio is 46%, a new flow control threshold value is set (e.g., by the analysis system) to be greater than the current flow control threshold value.

In some embodiments, the service application system (e.g., business system) comprises multiple business servers. In the event that the task processing values of the business servers are compared to the third predetermined value (e.g., at 560 of process 500), the task processing value of each business server in the service application system (e.g., business system) is compared with the third predetermined value. The analysis system can store or otherwise obtain a predetermined quantity. In the event that the quantity of business servers whose task processing value is greater than or equal to the first predetermined value exceeds the predetermined quantity, the current flow control threshold value may be deemed as too big and the business processor cluster and CPUs as unable to process current access requests.

According to various embodiments, the load data for each business server is updated in real time. In the event that the business server task processing values are obtained, the most recent task processing values of the business servers can be obtained (e.g., by the analysis system).

Referring back to FIG. 3A, at 330, the new flow control threshold value is determined. In the event that the determination has been made according to the historical flow control data to adjust the flow control threshold value to a first predetermined flow control threshold value, and the determination has been made according to the service application system (e.g., business system) load data to update (e.g., adjust) the flow control threshold value to a second predetermined flow control threshold value or to a third predetermined flow control threshold value, if the flow-limiting control priority levels are such that the priority level of the historical flow control data is higher than the priority level of the load data, then using the first predetermined flow control threshold value as the new flow control threshold value occurs.

In some embodiments, the determination to adjust the flow control threshold value is based at least in part on historical flow control data. In some embodiments, the determination to adjust the flow control threshold value to a second predetermined flow control threshold value or a third predetermined flow control threshold value is based at least in part on service application system (e.g., business system) load data. For example, the analysis system can determine to adjust the flow control threshold value to a first predetermined flow control threshold value according to the historical flow control data and can determine to adjust the flow control threshold value to a second predetermined flow control threshold value or a third predetermined flow control threshold value according to service application system (e.g., business system) load data. The new flow control threshold value must be the only flow control threshold value. Therefore, a determination needs to be made concerning the flow-limiting control priority levels, and the flow control threshold value corresponding to data with the higher flow-limiting control priority level is selected as the new flow control threshold value.

According to various embodiments, in the event that the internal servers in a service application system (e.g., business system) are running in a stable manner, the priority level of the historical flow control data can be set as the higher priority level. In some embodiments, the larger flow control threshold value may be selected as the new flow control threshold value. For example, the flow control threshold value that is largest among various control threshold values that are determined according to various types of information (e.g., historical flow control data, service application system (e.g., business system) load data, etc.) is deemed to be the new flow control threshold value.

According to various embodiments, in the event that the flow-limiting control priority levels are such that the load data priority level is higher than the historical flow control data priority level, a second predetermined flow control threshold value or a third predetermined flow control threshold value (e.g., as determined according to process 550) is selected as the new flow control threshold value.

The present application does not impose specific limitations with regard to the historical flow control data priority level and the load data priority level. Priority levels of the historical flow control data and the load data may be selected according to actual need (e.g., based on tasks to be processed or previously received access requests, and/or on historical performance of the system).

According to various embodiments, in the event that the internal servers in a service application system (e.g., business system) are under relative major stress (e.g., when the load is greater than 1 per core, the priority level of the load data can be set as the higher priority level. In some embodiments, in the event that the internal servers in a service application system (e.g., business system) are under relative major stress, the larger flow control threshold value may be selected as the new flow control threshold value.

Figure 3B:
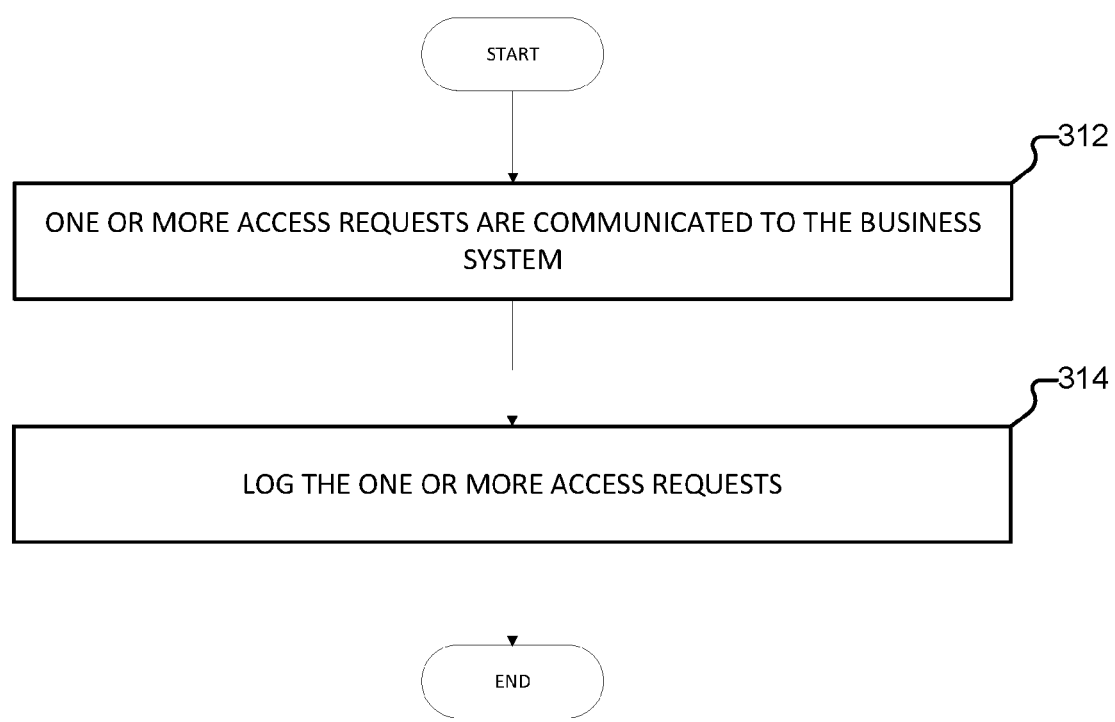
FIG. 3B is a flowchart of a flow control method according to various embodiments of the present application.

FIG. 3B is a flowchart of a flow control method according to various embodiments of the present application.

Referring to FIG. 3B, process 350 for controlling flow of data is provided. Process 350 can be implemented by a terminal or by a system such as system 100 of FIG. 1 (e.g., by gateway 104 or application system 106 of system 100 of FIG. 1), a gateway, a service application system (e.g., business system), a network device, or the like. Process 350 can be implemented by a computing system such as system 1300 of FIG. 13, or computer system 1400 of FIG. 14. Process 350 can be implemented in connection with 310 and/or 320 of process 300 of FIG. 3A.

According to various embodiments, process 350 of FIG. 3B can be implemented before the flow-limiting condition is read or obtained (e.g., by the analysis system).

At 312, one or more access requests are communicated to the service application system (e.g., business system). In some embodiments, one or more access terminals send one or more access requests to the service application system (e.g., business system). For example, the access terminals can send one or more access requests to the service application system (e.g., business system) via a gateway. In some embodiments, the gateway receives the one or more access requests and sends (e.g., forwards) the one or more access requests to the service application system (e.g., business system). In some embodiments, the service application system (e.g., business system) receives the one or more access requests. For example, the service application system (e.g., business system) can receive the one or more access requests from the one or more access terminals via the gateway. In some embodiments, the gateway uses the current flow control threshold value to exercise flow-limiting control over the access requests.

At 314, the one or more access requests are logged. In some embodiments, the service application system (e.g., business system) writes information pertaining to the one or more access requests into a logging system. In some embodiments, the flow control data obtained in connection with exercising the flow-limiting control can be written into a logging system in connection with the writing of the one or more access requests. The logging system can be configured to record (e.g., store) historical flow control data. In the event that the one or more access requests are written into the logging system, the logging system can send historical flow control data to the analysis system.

In some embodiments, the logging system is configured to store (e.g., record) historical flow control data. The historical flow control data stored by the logging system can be obtained by the analysis system and used as a basis for obtaining the new flow control threshold value. In some embodiments, the logging system presents the historical flow control data in the form of a form. For example, the logging system can format the presentation of the historical flow control data according to a predefined format (e.g., threshold: 100 requests per second, load: 0.8, CPU utilization: 50%).

According to various embodiments, an access terminal (possibly a client) sends access requests via a gateway to a service application system (e.g., business system). The access requests can be sent to the service application system (e.g., business system) transparently via the gateway. The service application system (e.g., business system) can be an application system that has deployed application software. After the service application system (e.g., business system) uses the access requests and the flow control data values obtained in connection with exercising the flow-limiting control to directly write such access requests into the logging system, or after the logging system logs access requests relating to the application system and flow control data obtained in connection with exercising the flow-limiting control, the flow control data can be sent to an analysis system. The analysis system can thus obtain historical flow control data from the received log contents.

According to various embodiments, the logging system is configured to store historical flow control data; however, no limitation is imposed on the logging system with regard to other data records.

According to various embodiments, after the current flow threshold value is updated (e.g., based on the new flow control threshold value), the gateway obtains the updated flow control threshold value. For example, the gateway can obtain the updated flow control threshold value from the analysis system. The analysis system can send the updated flow control threshold value to the gateway. In response to obtaining the updated flow control threshold value, the gateway can use the updated flow control threshold value in connection with exercising flow-limiting control over the access terminals (e.g., the access terminals associated with the corresponding access requests). The gateway can obtain the updated flow control threshold value after the analysis system updates the current flow control threshold value based at least in part on the new flow control threshold value.

In some embodiments, the analysis system obtains a new flow control threshold value based on the flow-limiting condition data. The gateway can obtain the new flow control threshold value from the analysis system and use the new flow control threshold value to limit access terminal flows. In some embodiments, the analysis system obtains a new flow control threshold value based on the flow-limiting condition data and communicates the new flow control threshold value to the gateway in connection with the gateway exercising flow-limiting control over the access terminals.

In some embodiments, the gateway performs any one or more of the following processing operations on the access requests: protocol conversion processing, parameter conversion processing, access control processing, and flow-limiting control processing. The protocol conversion processing can include converting a protocol of data received by the gateway into a different protocol (e.g., HTTP to HTTPS) and send to another network device (e.g., the analysis system, service application system (e.g., business system), or the like). The gateway can receive data from terminal and send a request to the service application system (e.g., a backend application server), and the gateway will send the response from the service application system to the terminal. The protocol processing can include processing to cause (e.g., ensure) networks with different protocols to interconnect. The parameter processing can include converting between different communication formats, data formats, or languages. The access control can include validating permissions of access terminals to confirm whether the access terminals have permission to access the service application system (e.g., business system) or to confirm the information items that the access terminals have permission to access. The flow-limiting processing includes limiting the speed with which user terminals access the service application system (e.g., business system) to prevent service application system and CPU crashes resulting from momentary access peaks, thereby ensuring that the system runs normally.

According to various embodiments, the gateway, after protocol conversion, parameter conversion, access control, flow control, or other such processing, communicates the access requests to a service application system (e.g., business system).

According to various embodiments, as a result of the operating status of a service application system (e.g., business system) undergoing a change or terminals conducting abnormal access of the service application system (e.g., business system), the analysis system changes in accordance with the change in flow-limiting condition data and thus obtains a new flow control threshold value. The gateway can use the new flow control threshold value to impose (e.g., enforce) flow limits on new access requests issued by terminals and thus avoids the problem of service application system (e.g., business system) crashes caused by incompatibility between the service application system (e.g., business system) operating status and the flow control threshold value. According to various embodiments, visits from a type of browser client are subjected to flow control. For example, the gateway can enforce flow control according to a type of browser client used in connection with an access request.

Figure 6:
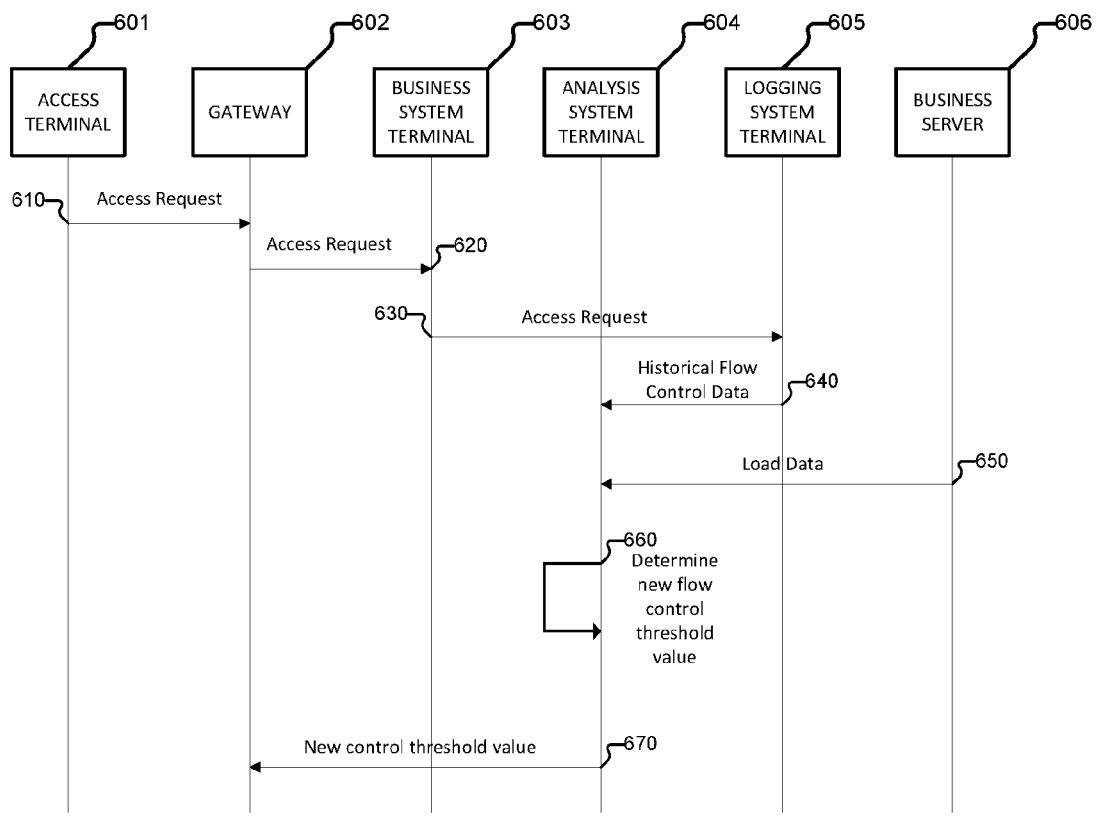
FIG. 6 is a diagram of an optional flow control method according to various embodiments of the present application.

FIG. 6 is a diagram of an optional flow control method according to various embodiments of the present application.

Referring to FIG. 6, process 600 for controlling flow of data is provided. Process 600 can be implemented by a terminal or by a system such as system 100 of FIG. 1 (e.g., by gateway 104 or application system 106 of system 100 of FIG. 1), a gateway, a network device, a service application system (e.g., business system), an analysis system, and/or the like. Process 600 can be implemented by one or more computing systems such as system 1300 of FIG. 13, or computer system 1400 of FIG. 14. Process 600 can implement process 300 of FIG. 3A, process 350 of FIG. 3B, process 400 of FIG. 4, process 500 of FIG. 5A, and/or process 550 of FIG. 5B.

At 610, an access request is communicated. An access terminal 601 can send the access request to gateway 602. The access terminal 601 can correspond to browser clients. For example, in the event that a user opens a browser client to view a network address (e.g., a web page), the browser client can implement the function of the access terminal sending an access request to the gateway 602. The browser client can send the access request to the gateway 602 in response to selection or input of an address to the browser client.

At 620, the access request is communicated to the service application system (e.g., business system). The gateway 602 can send the access request to service application system (e.g., business system) terminal 603. The gateway 602 can perform one or more of a protocol conversion, a parameter conversion, an access control, and a flow control, before communicating the access request to the service application system (e.g., business system) terminal 603. The gateway 602 can perform one or more of a protocol conversion, a parameter conversion, an access control, and a flow control in connection with the access request received from access terminal 601.

At 630, information associated with the access request is communicated to logging system terminal 605. For example, service application system (e.g., business system) terminal 603 can send the access request to logging system terminal 605. In response to receiving the access request, logging system terminal 605 can store the access request or information associated therewith (e.g., in a database).

At 640, historical flow control data is communicated. In some embodiments, logging system terminal 605 sends the historical flow control data to analysis system terminal 604.

At 650, load data is communicated. Business server 606 can send the load data to analysis system terminal 604.

At 660, a new flow control threshold value is determined. The new flow control threshold value can be determined based at least in part on one or more of the historical flow control data and the load data for each business server in the service application system (e.g., business system) (or a subset of business servers in the service application system (e.g., business system)). Analysis system terminal 604 can determine the new flow control threshold value.

In the event that the new flow control threshold value obtained by the analysis system according to the historical flow control data differs from the flow control threshold value obtained according to the load data associated with business servers, the new flow control threshold value can be determined according to preset priority levels (e.g., preset priority levels associated with flow control threshold values obtained or determined according to various information). If the historical flow control data has a higher priority level, then the new flow control threshold value obtained by the analysis system according to the historical flow control data is determined to be the new flow control threshold value. Otherwise, the flow control threshold value obtained according to the business servers can be determined to be the new flow control threshold value.

At 670, the new flow control threshold value is communicated. Gateway 602 can obtain the new flow control threshold value. For example, gateway 602 can receive the new flow control threshold value from analysis system terminal 604. Gateway 602 can acquire the new flow control threshold value confirmed by the analysis system terminal 604 and exercise flow-limiting control over the access terminals based on the new flow control threshold value.

In some embodiments, the analysis system communicates the new flow control threshold value to the gateway so that the new flow control threshold value replaces the current flow control threshold value. The analysis system can communicate the new flow control threshold value by updating the current flow control threshold value in a repository (to which the gateway can retrieve the updated flow control threshold value). The gateway exercises flow-limiting control over the access requests of the access terminals based at least in part on the new flow control threshold value. In some embodiments, the flow control method corresponds to the current flow-limiting conditions.

Please note that all the method embodiments described above have been presented as a series of a combination of actions in order to simplify the description. However, persons skilled in the art should know that the present invention is not limited by the action sequences that are described, for some of the steps may make use of another sequence or be implemented simultaneously in accordance with the present invention. Furthermore, persons skilled in the art should also know that the embodiments described in the Description are preferred embodiments and that the actions and modules involved therein are not necessarily required by the present invention.

Through descriptions of the above implementations, persons skilled in the art can clearly understand that methods based on the aforesaid embodiment may be realized through software with the necessary general-use hardware platform. Of course, hardware may also be used, but in many cases the former is the preferred implementation. Based on such an understanding, the technical scheme of the present invention, whether intrinsically or with respect to portions that contribute to the prior art, is realizable in the form of software products. These computer software products can be stored on storage media (such as ROM/RAM, magnetic disks, and optical disks) and include a certain number of commands used to cause a piece of terminal equipment (which could be a mobile phone, a computer, a server, or network equipment) to execute the methods of the present invention embodiments.

Figure 7:
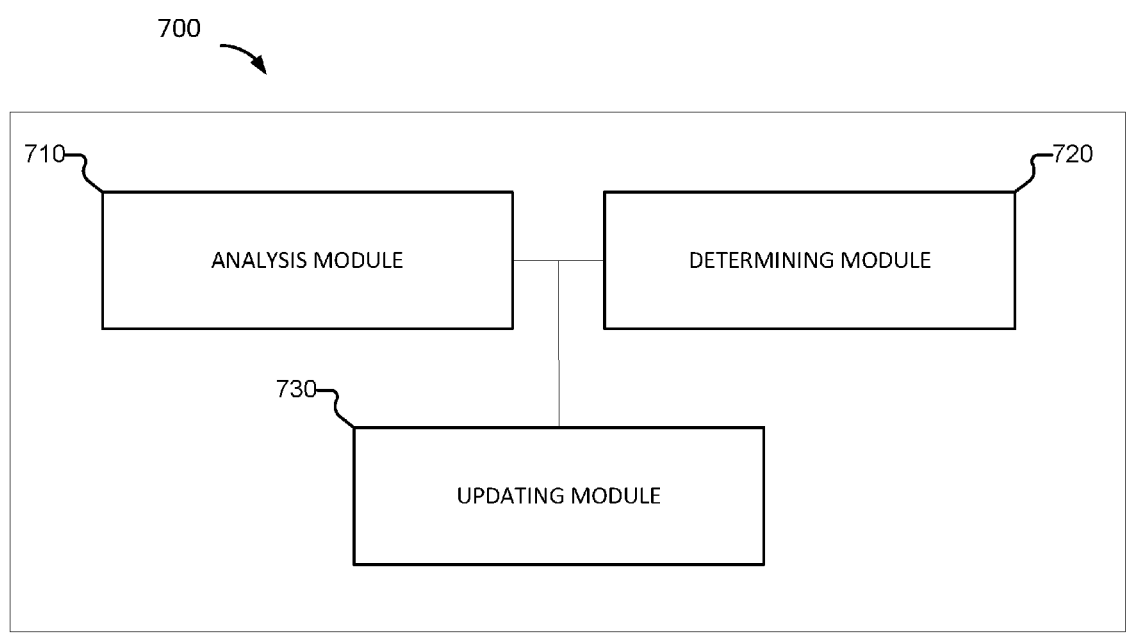
FIG. 7 is a diagram of a device according to various embodiments of the present application.

FIG. 7 is a diagram of a device according to various embodiments of the present application.

Referring to FIG. 7, device 700 for controlling flow of data is provided. Device 700 can be implemented by a terminal or by a system such as system 100 of FIG. 1 (e.g., by gateway 104 or application system 106 of system 100 of FIG. 1), a gateway, a network device, a service application system (e.g., business system), an analysis system, and/or the like. Device 700 can be implemented by one or more computing systems such as system 1300 of FIG. 13, or computer system 1400 of FIG. 14. Device 700 can implement process 300 of FIG. 3A, process 350 of FIG. 3B, process 400 of FIG. 4, process 500 of FIG. 5A, and/or process 550 of FIG. 5B, and at least part of process 600 of FIG. 6.

Device 700 comprises analysis module 710, determining module 720, and updating module 730.

Analysis module 710 is configured to detect access requests. For example, analysis module 710 can detect access requests communicated by (e.g., issued by) access terminals for accessing a service application system. Analysis module 710 can be further configured to obtain flow-limiting condition data.

Determining module 720 is configured to determine the new flow control threshold value. Determining module 720 can determine the new flow control threshold value based at least in part on the flow-limiting condition data. In some embodiments, determining module 720 can receive the flow-limiting condition data from analysis module 710.

Updating module 730 is configured to update the current flow control threshold value. In some embodiments, updating module 730 updates the current flow control threshold value using (e.g., based at least in part on) the new flow control threshold value.

According to various embodiments, access terminals may be any terminals that access a service application system (e.g., business system) through a network. Examples include smartphones, tablets, computers and other terminal devices. The service application system can comprise business services provided by a server that are accessed by a terminal via the Internet. Examples of a service application system include an ordering system and a logistics system.

According to various embodiments, the flow control threshold value is used to represent the maximum access value permitted by the gateway. For example, in the event that the access value for a terminal accessing the target service application system exceeds the flow control threshold value, the gateway will restrict or otherwise prohibit continued access by the access terminal of the target service application system. The access value can be one or more of the number of times the terminal accesses the target service application system within a preset period of time, the frequency with which the terminal accesses the target service application system, the number of times or frequency that a fixed IP address accesses the service application system, and the number of times or frequency that an API accesses the service application system, and/or any other appropriate value.

According to various embodiments, a service application system that is an ordering system serves as an example. In the event that a user sends an access request via a gateway to the target ordering system, the analysis system can use the obtained flow-limiting condition data as a basis for determining that the internal operating stress in the current ordering system is excessive and to adjust the flow control threshold value (e.g., to lower the flow control threshold value) in order to prevent excessive access requests from causing the ordering system to crash. After the analysis system obtains the new flow control threshold value, a lower new flow control threshold value replaces the current flow control threshold value. For example, after analysis module 710 obtains the new flow control threshold value (e.g., after the determining module 720 determines the new flow control threshold value), updating module 730 can update the flow control threshold value so as to replace the current flow control threshold value. The gateway equipment can use the new flow control threshold value to impose a flow limit on access associated with the service application system (e.g., user access or terminal access). In some embodiments, traffic flow associated with accessing the service application system is controlled based at least in part on the current flow control threshold value. For example, one or more access requests (e.g., subsequent to the current flow control threshold value being updated based on the new flow control threshold value) can be queued or denied. In some embodiments, the gateway equipment can queue or deny the access requests. In some embodiments, traffic flow associated with accessing the service application system is controlled according to whether a traffic measurement has reached the current flow control threshold value (e.g., that has been updated with the new flow control threshold value).

In some embodiments, because the new flow control threshold value is determined by the analysis system (e.g., analysis module 710 or determining module 720) according to flow-limiting condition data, and because the current flow control threshold value is replaced by the new flow control threshold value (e.g., updating module 730), the flow control threshold value determined using the scheme described above is a dynamic flow control threshold value that varies according to flow-limiting condition data.

Because flow-limiting condition data at least can include the current flow control threshold value, the new flow control threshold value obtained according to the flow-limiting condition is the flow control threshold value corresponding to the current flow-limiting condition. The dynamic new flow control threshold value can be considered as capable of correspondence with the current flow-limiting condition data.

According to various embodiments, in the event that the operating status of the service application system undergoes a change (e.g., an API develops a fault or the operating stress of the service application system becomes excessive) or a terminal abnormally accesses the service application system, a new flow control threshold value can be obtained (e.g., determining module 720 can determine the new flow control threshold value). For example, the analysis system can adjust the flow control threshold value according to the change in the flow-limiting condition data and thus obtains a new flow control threshold value. The gateway uses the new flow control threshold value to impose flow limits on the access requests received from the terminal. Because the new flow control threshold value is compatible with the operating status of the current service application system (e.g., the service application system operating status being embodied in the flow-limiting condition data), the new flow control threshold value is also a flow control threshold value compatible with the current operating status of the service application system. Accordingly, the compatibility between the new flow control threshold value and the operating status of the current service application system avoids the problem associated with the operating status of the service application system being in a variable state, but the flow control threshold value being a flow control threshold value resulting from a fixed threshold value and thus being incompatible with the operating status of the service application system. Incompatibility between the service application system operating status and the flow control threshold value can result in system crashes; accordingly, some embodiments having the compatibility between the new flow control threshold value and the operating status of the current service application system avoid the system crash problem, which results from incompatibility between the service application system operating status and the flow control threshold value.

Various embodiments solve the technical problem of the prior art associated with the flow-limiting strategy being a fixed flow-limiting strategy which, in certain circumstances, causes a mismatch between the fixed flow-limiting strategy and the operating status of the service application system, which in turn causes the service application system to crash.

In some embodiments, the flow-limiting condition comprises the current flow control threshold value. In some embodiments, the flow-limiting condition data comprises historical flow control data, service application system load data, or a combination thereof.

In some embodiments, the new flow control threshold value can be obtained either by historical flow control data or service application system load data. In some embodiments, the new flow control threshold value can be obtained from two-dimensional flow-limiting condition data that includes one or both of historical flow control data and the service application system, thus taking into account both service application system historical flow control conditions and service application system load conditions and thereby enabling the analysis system (or other device that obtains or determines the new flow control threshold) to obtain a new flow control threshold value based on historical flow control data and enabling the analysis system to acquire a new flow control threshold value corresponding to the service application system load conditions.

In some embodiments, historical flow control data comprises a flow-limiting count, flow-limiting frequency, or a combination thereof. The load data can comprise a task processing value or CPU utilization ratio.

In some embodiments, the flow control threshold value corresponds to, or otherwise comprises, the access user flow control threshold value, the access terminal address flow control threshold value, and the API flow control threshold value.

Figure 8:
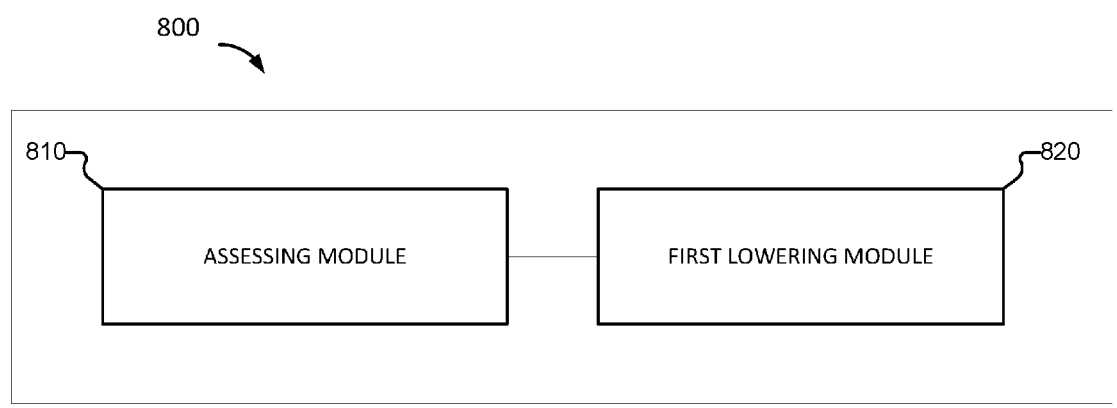
FIG. 8 is a diagram of a flow control device according to various embodiments of the present application.

FIG. 8 is a diagram of a flow control device according to various embodiments of the present application.

Referring to FIG. 8, device 800 for controlling flow of data is provided. Device 800 can be implemented by a terminal or by a system such as system 100 of FIG. 1 (e.g., by gateway 104 or application system 106 of system 100 of FIG. 1), a gateway, a network device, a service application system, an analysis system, and/or the like. Device 800 can be implemented by one or more computing systems such as system 1300 of FIG. 13, or computer system 1400 of FIG. 14. Device 800 can implement process 300 of FIG. 3A, process 350 of FIG. 3B, process 400 of FIG. 4, process 500 of FIG. 5A, and/or process 550 of FIG. 5B, and at least part of process 600 of FIG. 6.

In some embodiments, device 800 comprises assessing module 810 and a first lowering module 820. In some embodiments, device 800 corresponds to determining module 720 of FIG. 7.

The assessing module 810 can be configured to determine whether the flow-limiting count exceeds a predetermined count, whether the flow-limiting frequency exceeds a predetermined frequency value, or both.

The first lowering module 820 is configured to update or change the flow control threshold value. In some embodiments, the first lowering module 820 can update or change the flow control threshold value to a first predetermined flow control threshold value according to one or more of the flow-limiting count exceeds the predetermined count, the flow-limiting frequency exceeds the predetermined frequency value, or both. The first lowering module 820 can lower the flow control threshold value to a first predetermined flow control threshold value in the event that the flow-limiting count exceeds the predetermined count, the flow-limiting frequency exceeds the predetermined frequency value, or both.

The access user flow control threshold value can be the access frequency and/or the access count of users with regard to a fixed service application system. The access terminal address flow control threshold value can be the access frequency and/or access count of an access terminal address with regard to a fixed service application system. The API flow control threshold value can be the access frequency and/or access count of an API with regard to a fixed service application system.

Taking as an example case in which a predetermined count of 1,000 visits, a flow-limiting frequency of 20 visits/second (e.g., a predetermined frequency value equal to 20 visits/second), and a flow control threshold value that is the access user flow control threshold value, the number of visits the access users make to a service application system (e.g., the access count of users) is 1,243 and thus is in excess of the flow control threshold value, and the average number of visits per second (e.g., the access frequency of the user) in excess of the flow control threshold value is 17.3. Therefore, the access users' flow control threshold value exceeds the predetermined count. In the example described above, the current flow control threshold value is lowered to a first predetermined flow control threshold value to limit access requests by the aforesaid access users.

According to various embodiments, both the flow-limiting count and the flow-limiting frequency are assessment conditions. For example, if either the flow-limiting count or the flow-limiting frequency exceeds the corresponding preset value, the flow control threshold value will be lowered.

In some embodiments, the flow-limiting count is assessed to determine whether the flow control threshold value should be lowered in order to resolve the following scenarios. If an access user, an access terminal, or an API is flow-limited on multiple occasions, then that access user, access terminal, or API is subjecting the service application system that it is accessing to relatively great access pressure, and the aforesaid access can be deemed to be malicious access. To prevent the aforesaid access user, access terminal, or API from continuing to make high-frequency normal visits or malicious visits to the service application system, the analysis system will lower the new flow control threshold value from the current flow control threshold value in order to achieve the technical result of further flow limiting.

In some embodiments, the service application system comprises multiple business servers. The load data of each business server can be updated in real time.

Figure 9:
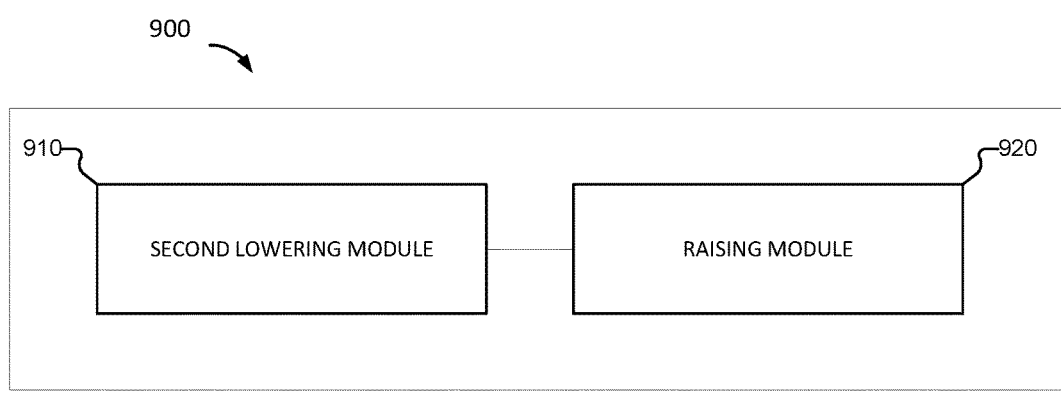
FIG. 9 is a diagram of a flow control device according to various embodiments of the present application.

FIG. 9 is a diagram of a flow control device according to various embodiments of the present application.

Referring to FIG. 9, device 900 for controlling flow of data is provided. Device 900 can be implemented by a terminal or by a system such as system 100 of FIG. 1 (e.g., by gateway 104 or application system 106 of system 100 of FIG. 1), a gateway, a network device, a service application system, an analysis system, and/or the like. Device 900 can be implemented by one or more computing systems such as system 1300 of FIG. 13, or computer system 1400 of FIG. 14. Device 900 can implement process 300 of FIG. 3A, process 350 of FIG. 3B, process 400 of FIG. 4, process 500 of FIG. 5A, and/or process 550 of FIG. 5B, and at least part of process 600 of FIG. 6.

Device 900 comprises a second lowering module 910 and a raising module 920. In some embodiments, device 900 corresponds to determining module 720 of FIG. 7.

The second lowering module 910 is configured to update or change the flow control threshold value. In some embodiments, the second lowering module 910 can update or change the flow control threshold value to a second predetermined flow control threshold value according to the task processing value of business servers determined to exceed a predetermined quantity within the service application system, and/or whether the CPU utilization ratio exceeds a second predetermined value. The second lowering module 910 can lower the flow control threshold value to a second predetermined flow control threshold value if the task processing value of business servers determined to exceed a predetermined quantity within the service application system is greater than or equal to a first predetermined value, and/or if the CPU utilization ratio is determined to be greater than or equal to a second predetermined value.

The raising module 920 is configured to update or change the flow control threshold value. In some embodiments, the raising module 920 can update or change the flow control threshold value according to the task processing value of business servers exceeding a predetermined quantity within the service application system and/or the CPU utilization ratio. The raising module 920 can raise the flow control threshold value to a third predetermined flow control threshold value in the event that the task processing value of business servers exceeding a predetermined quantity within the service application system is less than or equal to a third predetermined value, and/or in the event that the CPU utilization ratio is less than or equal to a fourth predetermined value.

According to various embodiments, the flow-limiting condition data comprises at least one or more preset flow-limiting control priority levels.

Figure 10:
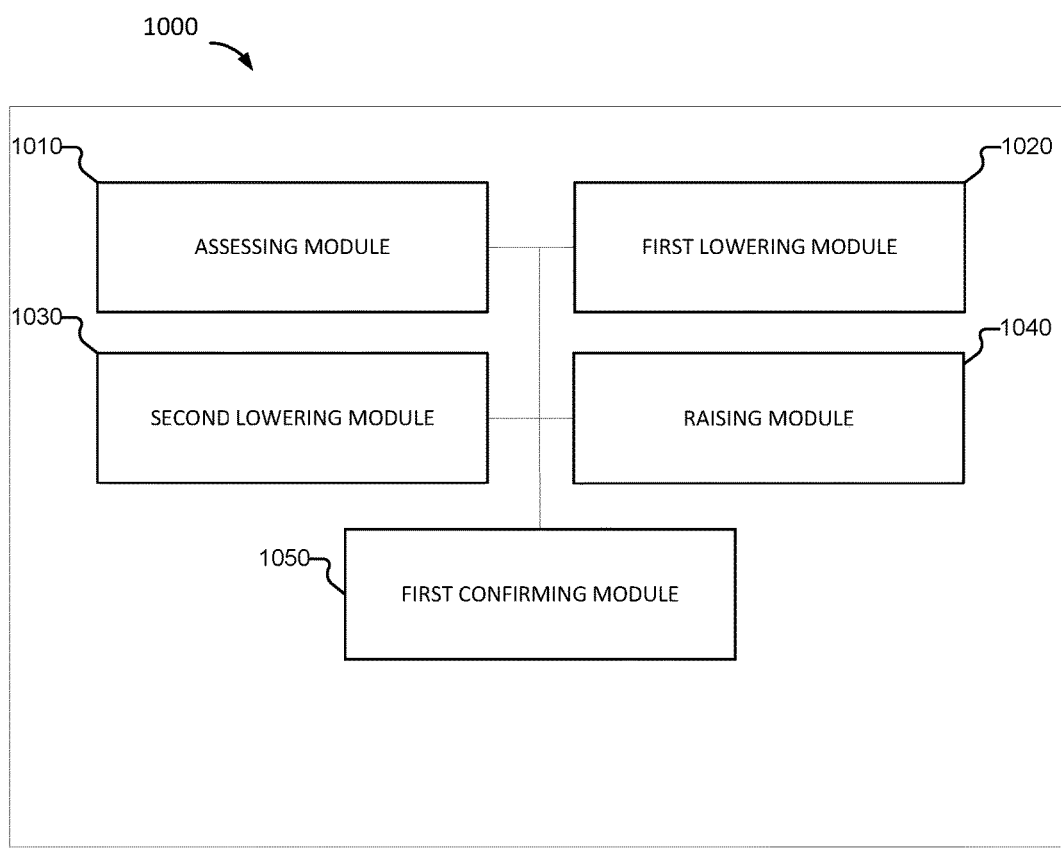
FIG. 10 is a diagram of a flow control device according to various embodiments of the present application.

Referring to FIG. 10, device 1000 for controlling flow of data is provided. Device 1000 can be implemented by a terminal or by a system such as system 100 of FIG. 1 (e.g., by gateway 104 or application system 106 of system 100 of FIG. 1), a gateway, a network device, a service application system, an analysis system, and/or the like. Device 1000 can be implemented by one or more computing systems such as system 1300 of FIG. 13, or computer system 1400 of FIG. 14. Device 1000 can implement process 300 of FIG. 3A, process 350 of FIG. 3B, process 400 of FIG. 4, process 500 of FIG. 5A, and/or process 550 of FIG. 5B, and at least part of process 600 of FIG. 6. In some embodiments, device 1000 corresponds to determining module 720 of device 700.

In some embodiments, device 1000 comprises an assessing module 1010, a first lowering module 1020, a second lowering module 1030, a raising module 1040, and a first confirming module 1050.

In some embodiments, assessing module 1010 corresponds to assessing module 810 of device 800.

In some embodiments, first lowering module 1020 corresponds to first lowering module 820 of device 800.

In some embodiments, second lowering module 1030 corresponds to 910 of device 900.

In some embodiments, raising module 1040 corresponds to 920 of FIG. 9.

First confirming module 1050 can be configured to determine the new flow control threshold value. For example, first confirming module 1050 can determine which of a plurality of determined new flow control threshold values that are determined according to various conditions or thresholds is to be used (e.g., in connection with updating the current flow control threshold value). In some embodiments, in the event that the determination has been made to adjust the flow control threshold value to a first predetermined flow control threshold value based on the historical flow control data, and the determination has been made to adjust the flow control threshold value to a second predetermined flow control threshold value or a third predetermined flow control threshold value based on the service application system load data, the first confirming module 1050 can determine the manner in which the flow control threshold value is to be adjusted according to priority levels associated with the respective conditions causing the adjustment of the flow control threshold value to be invoked. For example, if the flow-limiting control priority levels are such that the priority level of the historical flow control data is higher than the priority level of the load data, then the first confirming module 1050 can be determined to deem the first predetermined flow control threshold value as the new flow control threshold value.

In the aforesaid embodiment of the present application, the analysis system (e.g., device 700) makes the determination according to historical flow control data to adjust the flow control threshold value to a first predetermined flow control threshold value and makes the determination according to service application system load data to adjust the flow control threshold value to a second predetermined flow control threshold value or a third predetermined flow control threshold value. The new flow control threshold value should correspond to only a single flow control threshold value of the flow control threshold values determined according to different conditions or thresholds (e.g., according to the historical flow control data or the service application system load data). Therefore, a determination can be made concerning the flow-limiting control priority levels, and the flow control threshold value corresponding to data with the higher flow-limiting control priority level can be selected as the new flow control threshold value.

In some embodiments, in the event that the internal servers in a service application system are running in a stable manner, the priority level of the historical flow control data can be set as the higher priority level. In some embodiments, the larger flow control threshold value may be selected as the new flow control threshold value.

Figure 11:
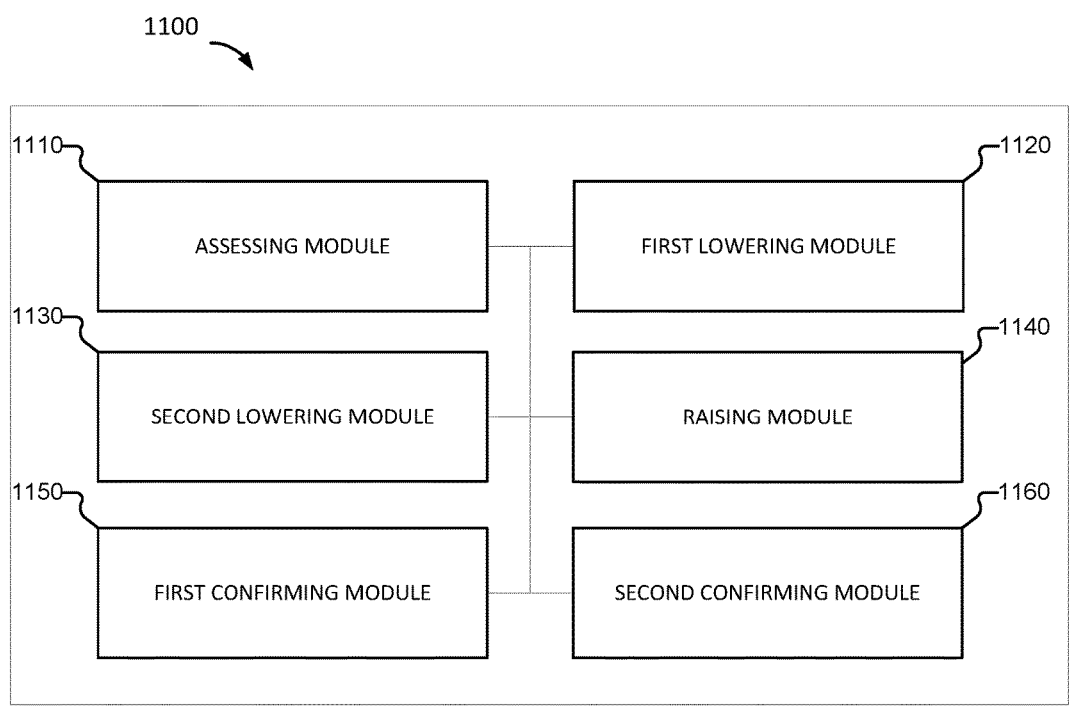
FIG. 11 is a diagram of a flow control device according to various embodiments of the present application.

FIG. 11 is a diagram of a flow control device according to various embodiments of the present application.

Referring to FIG. 11, device 1100 for controlling flow of data is provided. Device 1100 can be implemented by a terminal or by a system such as system 100 of FIG. 1 (e.g., by gateway 104 or application system 106 of system 100 of FIG. 1), a gateway, a network device, a service application system, an analysis system, and/or the like. Device 1100 can be implemented by one or more computing systems such as system 1300 of FIG. 13, or computer system 1400 of FIG. 14. Device 1100 can implement process 300 of FIG. 3A, process 350 of FIG. 3B, process 400 of FIG. 4, process 500 of FIG. 5A, and/or process 550 of FIG. 5B, and at least part of process 600 of FIG. 6, and device 1000 of FIG. 10. In some embodiments, device 1100 corresponds to determining module 720 of device 700.

In some embodiments, device 1100 comprises an assessing module 1110, a first lowering module 1120, a second lowering module 1130, a raising module 1140, a first confirming module 1150, and a second confirming module 1160.

In some embodiments, assessing module 1110 corresponds to assessing module 810 of device 800 or assessing module 1010 of device 1000.

In some embodiments, first lowering module 1120 corresponds to first lowering module 820 of device 800 or first lowering module 1020 of device 1000.

In some embodiments, second lowering module 1130 corresponds to second lowering module 910 of device 900 or second lowering module 1030 of device 1000.

In some embodiments, raising module 1140 corresponds to raising module 920 of FIG. 9 or raising module 1040 of device 1000.

In some embodiments, first confirming module 1150 corresponds to first confirming module 1050 of device 1000.

Second confirming module 1160 is configured to determine the new flow control threshold value. For example, second confirming module 1160 can determine which of a plurality of determined new flow control threshold values that are determined according to various conditions or thresholds is to be used (e.g., in connection with updating the current flow control threshold value). In some embodiments, in the event that the flow-limiting control priority levels are such that the load data priority level is higher than the historical flow control data priority level, the second predetermined flow control threshold value or the third predetermined flow control threshold value is deemed to be the new flow control threshold value.

Please note that, with regard to the historical flow control data priority level and the load data priority level, the present application does not impose specific limitations. Priority levels of the historical flow control data and the load data may be selected according to actual need.

In some embodiments, in the event that the internal servers in a service application system are under relative major stress, the priority level of the load data can be set as the higher priority level. In some embodiments, the larger flow control threshold value may be selected as the new flow control threshold value.

The third predetermined value corresponds to, or otherwise is associated with, the task processing value when the business servers are relatively idle. The fourth predetermined value corresponds to, or otherwise is associated with, the CPU utilization ratio when the CPUs are relatively idle. For example, if the task processing value of business servers exceeding a predetermined quantity within the service application system is less than or equal to a third predetermined value, or the CPU utilization ratio is less than or equal to a fourth predetermined value, the business processor cluster or CPUs can be regarded as relatively idle. If the current flow control threshold value is still used to impose flow limits, then a certain amount of resources will be wasted. For example, the business servers or CPUs are running in a relatively idle state, but the users, addresses, or APIs that are accessing the service application system via a gateway are all unable to access the service application system. Therefore, the analysis system raises the flow control threshold value according to the aforesaid flow-limiting condition data in order to enable other users, addresses, or APIs to access the service application system as soon as possible.

As an illustrative example, the first predetermined value is 200,000, the second predetermined value is 85%, the third predetermined value is 8,000, and the fourth predetermined value is 50%. If 12 of 20 business servers in a service application system have a task processing value greater than 200,000, and the CPU utilization ratio is 83%, a new flow control threshold value is set (e.g., by the analysis system or device 700) to be less than the current flow control threshold value (e.g., because the task processing value exceeds the first predetermined value). If 3 of 20 business servers in a service application system have a task processing value less than 8,000, and the CPU utilization ratio is 46%, a new flow control threshold value is set (e.g., by the analysis system or device 700) to be is greater than the current flow control threshold value.

In some embodiments, the analysis system (e.g., device 700) comprises multiple business servers. In the event that the task processing values of the business servers are compared to the third predetermined value (e.g., at 580 of process 550 or by device 700), the task processing value of each business server in the service application system is compared with the third predetermined value. The analysis system (e.g., device 700) can store or otherwise obtain a predetermined quantity. In the event that the quantity of business servers whose task processing value is greater than or equal to the first predetermined value exceeds the predetermined quantity, the current flow control threshold value may be deemed as too big and the business processor cluster and CPUs as unable to process current access requests.

In some embodiments, the load data for each business server is updated in real time. Accordingly, in connection with acquiring business server task processing values, the analysis system (e.g., device 700) can acquire the most recent task processing values of the business servers.

Figure 12:
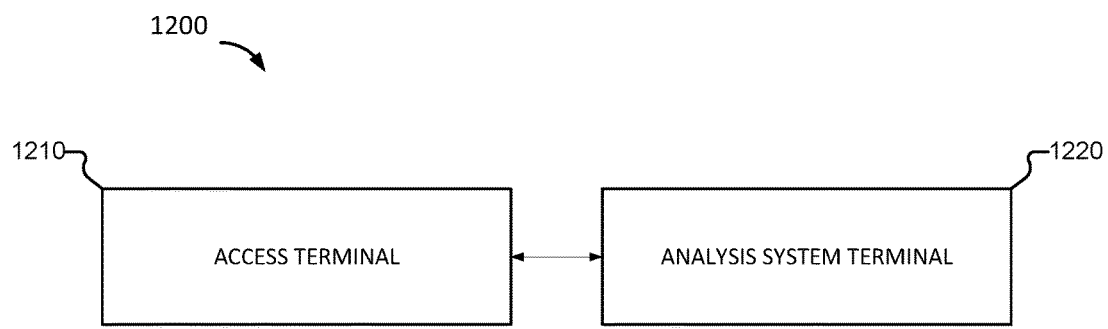
FIG. 12 is a diagram of a flow control system according to various embodiments of the present application.

FIG. 12 is a diagram of a flow control system according to various embodiments of the present application.

Referring to FIG. 12, system 1200 for controlling flow of data is provided. System 1200 can implement at least a part of system 100 of FIG. 1, terminal 200 of FIG. 2, process 300 of FIG. 3A, process 350 of FIG. 3B, process 400 of FIG. 4, process 500 of FIG. 5A, process 550 of FIG. 5B, process 600 of FIG. 6, device 700 of FIG. 7, device 800 of FIG. 8, device 900 of FIG. 9, device 1000 of FIG. 10, and/or device 1100 of FIG. 11.

System 1200 comprises one or more access terminals 1210 and an analysis system 1220.

The one or more access terminals 1210 can communicate (e.g., issue) access requests to a service application system. The one or more access terminals 1210 can send an access request to the service application system in connection with a browsing on the corresponding terminal (e.g., in a browser client installed thereon) or other navigation to an address of the service application system.

The analysis system 1220 can communicate (e.g., either directly or via a gateway) with the one or more access terminals 1210, detect access requests issued by the one or more access terminals 1210 for accessing the service application system, acquire flow-limiting condition data, determine a new flow control threshold value according to the flow-limiting condition data, and use the new flow control threshold value to update the current flow control threshold value. The flow-limiting data can comprise a current flow control threshold value.

Figure 13:
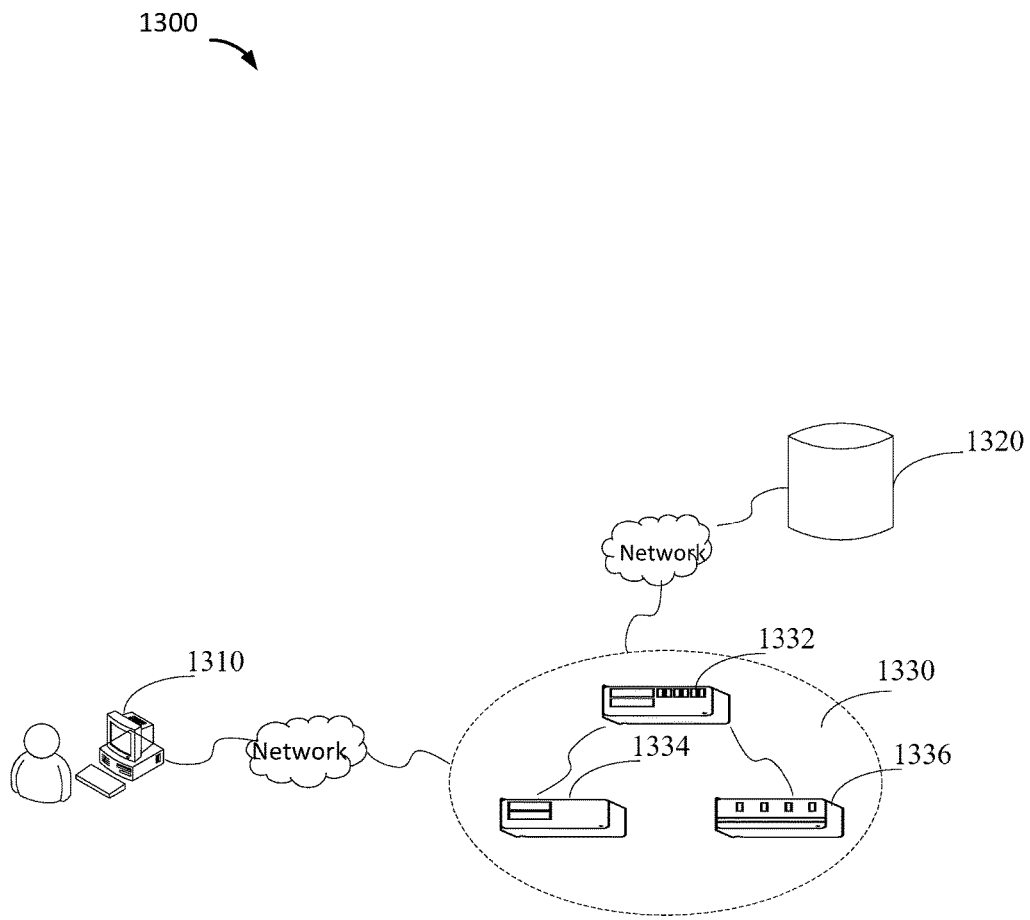
FIG. 13 is a diagram of a flow control system according to various embodiments of the present application.

FIG. 13 is a diagram of a flow control system according to various embodiments of the present application.

Referring to FIG. 13, system 1300 for controlling flow of data is provided. System 1300 can implement at least a part of system 100 of FIG. 1, terminal 200 of FIG. 2, process 300 of FIG. 3A, process 350 of FIG. 3B, process 400 of FIG. 4, process 500 of FIG. 5A, process 550 of FIG. 5B, process 600 of FIG. 6, device 700 of FIG. 7, device 800 of FIG. 8, device 900 of FIG. 9, device 1000 of FIG. 10, device 1100 of FIG. 11, and/or system 1200 of FIG. 12.

System 1300 comprises one or more access terminals 1310, service application system 1320, and one or more terminals 1330. The one or more access terminals 1310 and the service application system 1320 (e.g., one or more terminals such as servers) can be connected to, and communicate over, a network. The one or more access terminals 1310 can correspond to access terminals 1210 of system 1200.

In some embodiments, service application system 1320 is an ordering system. In the event that a user sends (via one or more access terminals 1310) an access request over the network (e.g., via a gateway) to the target ordering system, the analysis system uses the acquired flow-limiting condition data as a basis for determining that the internal operating stress in the current ordering system is excessive and that the flow control threshold value needs to be adjusted (e.g., lowered) in order to prevent excessive access requests from causing the ordering system to crash. After the analysis system terminal obtains the new flow control threshold value, a lower new flow control threshold value replaces the current flow control threshold value. The gateway uses the new flow control threshold value to impose a flow limit on user access.

In some embodiments, because the new flow control threshold value is determined by the analysis system according to flow-limiting condition data, and because the current flow control threshold value is replaced by the new flow control threshold value, the flow control threshold value determined using the scheme described above is a dynamic flow control threshold value that varies according to flow-limiting condition data.

Because flow-limiting condition data can include the current flow control threshold value, the new flow control threshold value obtained according to the flow-limiting condition is the flow control threshold value corresponding to the current flow-limiting condition. The dynamic new flow control threshold value can be considered as associated with the current flow-limiting condition data.

According to various embodiments, in the event that the operating status of the service application system terminal undergoes a change (e.g., an API develops a fault or the operating stress of the business system terminal becomes excessive) or a terminal abnormally accesses the business system terminal, a new flow threshold value can be obtained. For example, the analysis system can adjust the flow control threshold value according to the change in the flow-limiting condition data and thus obtains a new flow control threshold value. The gateway uses the new flow control threshold value to impose flow limits on the access requests from the one or more access terminals. Because the new flow control threshold value is compatible with the operating status of the current service application system terminal (e.g., the service application system terminal operating status being embodied in the flow-limiting condition data), the new flow control threshold value is also a flow control threshold value compatible with the current operating status of the service application system terminal. Accordingly, the compatibility between the new flow control threshold value and the operating status of the current service application system avoids the problem associated with the operating status of the service application system terminal in a variable state, but the flow control threshold value being a flow control threshold value resulting from a fixed threshold value and thus potentially incompatible with the operating status of the service application system terminal. Accordingly, some embodiments having the compatibility between the new flow control threshold value and the operating status of the current service application system avoid the system crash problem, which results from incompatibility between the service application system terminal operating status and the flow control threshold value.

Various embodiments solve the technical problem of the prior art associated with the flow-limiting strategy being a fixed flow-limiting strategy that, in certain circumstances, causes a mismatch between the fixed flow-limiting strategy and the operating status of the service application system terminal, which in turn causes the service application system terminal to crash.

In various embodiments, the flow-limiting condition data comprises the current flow control threshold value. The flow-limiting condition data further comprises the historical flow control data, the service application system load data, or a combination thereof.

In some embodiments, the new flow control threshold value can be obtained based at least in part on the historical flow control data, the service application system load data, or a combination thereof. In some embodiments, the new flow control threshold value can be obtained from two-dimensional flow-limiting condition data that includes both historical flow control data and service application system load data, thus taking into account both service application system historical flow control conditions and service application system load conditions and thereby enabling the analysis system (or other device that obtains or determines the new flow control threshold) to obtain a new flow control threshold value based on historical flow control data and enabling it to acquire a new flow control threshold value corresponding to service application system load conditions.

In some embodiments, the historical flow control data comprises a flow-limiting count, flow-limiting frequency, or a combination thereof. In some embodiments, the load data comprises a task processing value, a CPU utilization ratio, or a combination thereof.

In some embodiments, analysis system terminal 1220 is further configured to determine whether the flow-limiting count exceeds a predetermined count and/or the flow-limiting frequency exceeds a predetermined frequency value. Analysis system 1220 can adjust the flow control threshold value. For example, if the flow-limiting count is determined to exceed the predetermined count, and/or the flow-limiting frequency is determined to exceed the predetermined frequency value, analysis system terminal 1220 can lower the flow control threshold value to a first predetermined flow control threshold value.

In some embodiments, system 1200 includes a logging system terminal. The historical flow control data can be collected by a logging system terminal from access request logs. The historical flow control data can be provided to the analysis system terminal 1220. In some embodiments, the logging system terminal can provide (e.g., send) the historical flow control data to the analysis system terminal 1220.

The access user flow control threshold value can be the access frequency or access count of users with regard to a fixed service application system terminal. The access terminal address flow control threshold value can be the access frequency or access count of an access terminal address with regard to a fixed service application system terminal. The API flow control threshold value can be the access frequency or access count of an API with regard to a fixed service application system.

Taking as an example a case in which a predetermined count of 1,000 visits, a flow-limiting frequency of 20 visits/second (e.g., a predetermined frequency value equal to 20 visits/second), and a flow control threshold value that is the access user flow control threshold value, the number of visits the access users make to a service application system terminal (e.g., the access count of users) is 1,243 and thus is in excess of the flow control threshold value, and the average number of visits per second (e.g., the access frequency of the user) in excess of the flow control threshold value is 17.3. Therefore, the access users' flow control threshold value exceeds the predetermined count. In the example described above, the current flow control threshold value is lowered to a first predetermined flow control threshold value to limit access requests by the aforesaid access users.

Both the flow-limiting count and the flow-limiting frequency can be assessment conditions. For example, if either the flow-limiting count or the flow-limiting frequency exceeds the corresponding preset value, the flow control threshold value will be lowered.

In some embodiments, the flow-limiting count is assessed to determine whether the flow control threshold value should be lowered in order to resolve the following scenarios. If an access user, an access terminal, or an API is flow-limited on multiple occasions, then that access user, access terminal, or API is subjecting the service application system terminal that it is accessing to relatively great access pressure, and the aforesaid access can be deemed to be a malicious access. To prevent the aforesaid access user, access terminal, or API from continuing to make high-frequency normal visits or malicious visits to the service application system terminal, the analysis system will lower the new flow control threshold value from the current flow control threshold value in order to achieve the technical result of further flow limiting.

In some embodiments, analysis system terminal 1220 is further configured to lower the flow control threshold value to a second predetermined flow control threshold value if the task processing value of business servers exceeding a predetermined quantity within the service application system is determined to be greater than or equal to a first predetermined value, or if the CPU utilization ratio is determined to be greater than or equal to a second predetermined value, lower the flow control threshold value to a second predetermined flow control threshold value. In some embodiments, analysis system terminal 1220 is further configured to raise the flow control threshold value to a third predetermined flow control threshold value if the task processing value of business servers exceeding a predetermined quantity within the service application system is less than or equal to a third predetermined value, or if the CPU utilization ratio is less than or equal to a fourth predetermined value.

In some embodiments, the business server load data is sent by the business servers to the analysis system (e.g., to the analysis system terminal 1220).

The first predetermined value can correspond to the processing value for relatively large tasks that business processors can process while running normally. The second predetermined value can correspond to a relatively large CPU utilization ratio that CPUs can use while running normally. Therefore, if the task processing value of business servers exceeding a predetermined quantity within the service application system is greater than or equal to a first predetermined value, or the CPU utilization ratio is greater than or equal to a second predetermined value, and if the current flow control threshold value continues to be used, then some business servers or CPUs may experience fault or crash events even if some business servers or CPUs are running overloaded.

The third predetermined value can correspond to the task processing value when the business servers are relatively idle. The fourth predetermined value can correspond to the CPU utilization ratio when the CPUs are relatively idle. As an example, if the task processing value of business servers exceeding a predetermined quantity within the service application system is less than or equal to a third predetermined value, or the CPU utilization ratio is less than or equal to a fourth predetermined value, the business processor cluster or CPUs can be regarded as relatively idle. If the current flow control threshold value is still used to impose flow limits, then a certain amount of resources will be wasted. The business servers or CPUs are running in a relatively idle state, but the users, addresses, or APIs that are accessing the service application system terminal via a gateway are all unable to access the service application system terminal. Therefore, the analysis system raises the flow control threshold value according to the aforesaid flow-limiting condition data in order to enable other users, addresses, or APIs to access the service application system terminal as soon as possible.

The service application system can comprise multiple business servers (e.g., production servers). In the event that the task processing values of the business servers are compared to the third predetermined value, the task processing value of each business server in the service application system is compared with the third predetermined value. The analysis system can store a predetermined quantity. When the quantity of business servers whose task processing value is greater than or equal to the first predetermined value exceeds the predetermined quantity, the current flow control threshold value can be regarded as too big and the business processor cluster and CPUs as unable to process current access requests.

In some embodiments, the load data for each business server is updated in real time. In the event that business server task processing values are obtained, the analysis system can obtain the most recent task processing values of the business servers. System 1200 can further include a gateway. The gateway can separately communicate with the access terminals and the analysis system terminal. The gateway imposes or otherwise enforces flow-limiting control over one or more access requests received in connection with a service application system. For example, the gateway can use the current flow control threshold value to exercise flow-limiting control over access requests and can obtain from the analysis system terminal an updated flow control threshold value. The gateway can receive the updated flow control threshold value sent by the analysis system terminal, and use the updated flow control threshold value to exercise flow-limiting control over the access terminals.

In some embodiments, the analysis system (e.g., analysis system terminal 1220) can obtain a new flow control threshold value based on the flow-limiting condition data. The gateway can acquire the new flow control threshold value from the analysis system and use the new flow control threshold value to limit access terminal flows. In some embodiments, the analysis system obtains a new flow control threshold value based on the flow-limiting condition data and sends the flow-limiting condition data to the gateway. In response to receiving the flow-limiting condition data, the gateway exercises flow-limiting control over the access terminals.

Various embodiments include a computer terminal. The computer terminal can correspond to any computer terminal device within a cluster of computer terminals. In some embodiments, the computer terminal can also be replaced with a terminal device such as a mobile terminal.

In some embodiments, the computer is located on any one network device among multiple network devices of a computer network.

The computer terminal can execute the program code for the following steps in an application program flow control method. For example, the computer terminal can execute instructions in connection with detecting access requests issued by the access terminals for accessing the service application system, acquiring flow-limiting condition data, determining the new flow control threshold value according to the flow-limiting condition data, and using the new flow control threshold value to update the current flow control threshold value.

The one or more terminals 1330 of system 1300 can comprise a computer terminal. The one or more terminals 1330 can comprise one or more processors 1332, memory 1334, and a communication device 1336.

The memory 1334 can be used to store software programs and modules (e.g., program instructions/modules corresponding to a flow control method and a device). By running software programs and modules stored in the memory 1334, the one or more processors 1332 execute various function apps and data processing (i.e., the one or more processors 1332 can implement the aforesaid flow control method). Memory 1334 may comprise one or more of high-speed random access memory, non-volatile memory, such as one or more magnetic storage devices, flash memory or other non-volatile solid-state memory, and memory that is remotely disposed relative to the processor. Such remote memory may be connected to a terminal via a network. Examples of the aforesaid network comprise but are not limited to the Internet, corporate intranets, local area networks, mobile communication networks, and combinations thereof.

The one or more processors 1332 can, through the transmitting device, call information and applications stored in memory 1334 in order to execute instructions in connection with detecting access requests issued by the access terminals for accessing the service application system, acquiring flow-limiting condition data, determining new flow control threshold values based on said flow-limiting condition data, and using the new flow control threshold values to update current flow control threshold values.

In some embodiments, the one or more processors 1332 further execute program code according to which flow-limiting condition data comprises historical flow control data, service application system load data, or a combination thereof.

In some embodiments, the one or more processors 1332 may further execute program code according to which historical flow control data comprises a flow-limiting count, a flow-limiting frequency, or a combination thereof. The load data can comprise a task processing value, a CPU utilization ratio, or a combination thereof.

In some embodiments, the one or more processors 1332 further execute program code for which the flow control threshold value corresponds to one or more of an access user flow control threshold value, an access terminal address flow control threshold value and an API flow control threshold value. The determining of the new flow control threshold values according to the flow-limiting condition data comprises: determining whether the flow-limiting count exceeds a predetermined count and/or the flow-limiting frequency exceeds a predetermined frequency value; and adjusting the flow control threshold value (e.g., lowering the flow control threshold value to a first predetermined flow control threshold value) if the flow-limiting count exceeds the predetermined count, and/or the flow-limiting frequency exceeds the predetermined frequency value.

In some embodiments, the one or more processors 1332 may further execute program code in connection with updating the load data for the service application system in real time. The service application system can comprise multiple business servers.

In some embodiments, determining the new flow control threshold value according to the flow-limiting condition data comprises if the task processing value of business servers exceeding a predetermined quantity within the service application system is greater than or equal to a first predetermined value, or if the CPU utilization ratio is greater than or equal to a second predetermined value, then lowering the flow control threshold value to a second predetermined flow control threshold value. In some embodiments, determining the new flow control threshold value according to the flow-limiting condition data comprises if the task processing value of business servers exceeding a predetermined quantity within the service application system is less than or equal to a third predetermined value, or if the CPU utilization ratio is less than or equal to a fourth predetermined value, then raising the flow control threshold value to a third predetermined flow control threshold value.

In some embodiments, the one or more processors 1332 may further execute program code for which the flow-limiting condition data comprises at least a preset flow-limiting control priority level and for which determining the new flow control threshold value according to the flow-limiting condition data comprises in the event that the determination has been made according to the historical flow control data to adjust the flow control threshold value to a first predetermined flow control threshold value, and the determination has been made according to the service application system load data to adjust the flow control threshold value to a second predetermined flow control threshold value or a third predetermined flow control threshold value, if the flow-limiting control priority levels are such that the priority level of the historical flow control data is higher than the priority level of the load data, then selecting or otherwise determining the first predetermined flow control threshold value as the new flow control threshold value.

In some embodiments, one or more processors 1332 further execute for which in the event that the flow-limiting control priority levels are such that the load data priority level is higher than the historical flow control data priority level, selecting or otherwise determining a second predetermined flow control threshold value or a third predetermined flow control threshold value as the new flow control threshold value.

In some embodiments, one or more processors 1332 execute program code for the access terminal sending access requests to the service application system via a gateway, wherein the gateway is configured to use the current flow control threshold value to exercise flow-limiting control over access requests, the service application system writing the access requests and the flow control data obtained when exercising the flow-limiting control into a logging system, the logging system is configured to record historical flow control data, and wherein, in the event that access requests are written into the logging system, the logging system sends historical flow control data to the analysis system.

In some embodiments, one or more processors 1332 execute program code for the gateway to acquire from the analysis system an updated flow control threshold value, or for the analysis system to send the updated flow control threshold value to the gateway, and for causing the gateway to use the updated flow control threshold value to exercise flow-limiting control over the access terminals.

In some embodiments, one or more processors 1332 execute program code for the gateway to perform any one or more of the following operations on the access requests: a protocol conversion processing, a parameter conversion processing, an access control processing, and a flow-limiting control processing.

Because flow-limiting condition data at least includes the current flow control threshold value, the new flow control threshold value obtained according to the flow-limiting condition is the flow control threshold value corresponding to the current flow-limiting condition. The dynamic new flow control threshold value can be considered as capable of correspondence with the current flow-limiting condition data.

According to various embodiments, in the event that the operating status of the service application system undergoes a change (e.g., an API develops a fault or the operating stress of the service application system becomes excessive) or a terminal abnormally accesses the service application system, a new flow threshold value can be obtained. For example, the analysis system changes according to the change in the flow-limiting condition data and thus obtains a new flow control threshold value. The gateway uses the new flow control threshold value to impose flow limits on the access requests received from the terminal. Because the new flow control threshold value is compatible with the operating status of the current service application system (e.g., the service application system operating status being embodied in the flow-limiting condition data), the new flow control threshold value is also a flow control threshold value compatible with the current operating status of the service application system. Accordingly, the compatibility between the new flow control threshold value and the operating status of the current service application system avoids the problem associated with the operating status of the service application system in a variable state, but the flow control threshold value being a flow control threshold value resulting from a fixed threshold value and thus potentially incompatible with the operating status of the service application system. Incompatibility between the service application system operating status and the flow control threshold value can result in system crashes; accordingly, some embodiments having the compatibility between the new flow control threshold value and the operating status of the current service application system avoids the system crash problem, which results from incompatibility between the service application system operating status and the flow control threshold value.

Various embodiments solve the technical problem of the prior art associated with the flow-limiting strategy being a fixed flow-limiting strategy that, in certain circumstances, causes a mismatch between the fixed flow-limiting strategy and the operating status of the service application system, which in turn causes the service application system to crash. A person with ordinary skill in the art can understand that the structure shown in FIG. 13 is merely illustrative. The computer terminal may be a smartphone (such as an Android phone or an iOS phone), a tablet computer, a palmtop computer, a mobile Internet device (MID), a PAD, or other such device. FIG. 13 does not limit the structures of the aforesaid electronic devices. For example, the computer may further comprise more or fewer components (such as network interfaces, display devices, etc.) than shown in FIG. 13 or may have a configuration that differs from the one shown in FIG. 13.

A person with ordinary skill in the art may understand that all or some of the steps in the various methods of the embodiments described above can be carried out by instructing terminal device-related hardware via programs. These programs may be stored in computer-readable storage media. The storage media may include flash disks, read-only memory (ROM), random access memory (RAM), magnetic disks, optical disks, etc.

Various embodiments provide a storage medium. The storage medium can be used to save the program code executed by the flow control method process 300 of FIG. 3A, process 350 of FIG. 3B, process 400 of FIG. 4, process 500 of FIG. 5A, process 550 of FIG. 5B, and/or process 600 of FIG. 6.

In some embodiments, the storage medium is located in any computer terminal in a computer terminal group in a computer network or located in any mobile terminal in a mobile terminal group.

In some embodiments, a storage medium is set up to store the program code that when executed, causes one or more processors to detect access requests issued by the access terminals for accessing the service application system, obtain flow-limiting condition data, determine a new flow control threshold value according to the flow-limiting condition data, and use the new flow control threshold value to update the current flow control threshold value.

In some embodiments, one or more processors may further execute program code for which the flow-limiting condition data comprises historical flow control data, service application system load data, or a combination thereof.

In some embodiments, a storage medium is configured to store the program code for which historical flow control data comprises a flow-limiting count, a flow-limiting frequency, or a combination thereof. In some embodiments, a storage medium is configured to store the program code for which load data comprises a task processing value, a CPU utilization ratio, or a combination thereof.

In some embodiments, a storage medium is configured to store the program code for which the flow control threshold value corresponds to any one or more of an access user flow control threshold value, an access terminal address flow control threshold value, and an API flow control threshold value. In some embodiments, a storage medium is configured to store the program code for determining the new flow control threshold value according to the flow-limiting condition data, and for which determining the new flow control threshold value according to the flow-limiting condition data comprises determining whether the flow-limiting count exceeds a predetermined count and/or the flow-limiting frequency exceeds a predetermined frequency value, and if the flow-limiting count is determined to exceed the predetermined count, and/or the flow-limiting frequency is determined to exceed the predetermined frequency value, lowering the flow control threshold value to a first predetermined flow control threshold value.

In some embodiments, a storage medium is configured to store the program code updating load data of each business server of a service application system in real time. In some embodiments, a storage medium is configured to store the program code for determining a new flow control threshold value according to flow-limiting condition data for which determining the new flow control threshold value according to flow-limiting condition data comprises lowering the flow control threshold value to a second predetermined flow control threshold value in the event that the task processing value of business servers exceeding a predetermined quantity within the service application system is greater than or equal to a first predetermined value, or if the CPU utilization ratio is greater than or equal to a second predetermined value. In some embodiments, a storage medium is configured to store the program code for determining a new flow control threshold value according to flow-limiting condition data for which determining the new flow control threshold value according to flow-limiting condition data comprises raising the flow control threshold value to a third predetermined flow control threshold value if the task processing value of business servers exceeding a predetermined quantity within the service application system is less than or equal to a third predetermined value, or if the CPU utilization ratio is less than or equal to a fourth predetermined value.

In some embodiments, a storage medium is configured to store the program code for which the flow-limiting condition data comprises a preset flow-limiting control priority level. In some embodiments, a storage medium is configured to store the program code for determining the new flow control threshold value according to the flow-limiting condition data. In some embodiments, a storage medium is configured to store the program code for which determining the new flow control threshold value according to the flow-limiting condition data comprises in the event that the determination has been made according to the historical flow control data to adjust the flow control threshold value to a first predetermined flow control threshold value, and the determination has been made according to the service application system load data to adjust the flow control threshold value to a second predetermined flow control threshold value or a third predetermined flow control threshold value, if the flow-limiting control priority levels are such that the priority level of the historical flow control data is higher than the priority level of the load data, then selecting or otherwise determining the first predetermined flow control threshold value as the new flow control threshold value.

In some embodiments, a storage medium is configured to store the program code for selecting a second predetermined flow control threshold value or a third predetermined flow control threshold value as the new flow control threshold value in the event that the flow-limiting control priority levels are such that the load data priority level is higher than the historical flow control data priority level.

In some embodiments, a storage medium is configured to store the program code for accessing terminals sending access requests to a service application system via a gateway. The gateway is configured to use the current flow control threshold value to exercise flow-limiting control over the access requests. In some embodiments, a storage medium is configured to store the program code for the service application system to write the access requests, and the flow control data obtained into a logging system in connection with exercising the flow-limiting control. The logging system is configured to record historical flow control data. In the event that access requests are written into the logging system, the logging system sends historical flow control data to the analysis system.

In some embodiments, a storage medium is configured to store the program code for the gateway to acquire from the analysis system an updated flow control threshold value, or for the analysis system to send the updated flow control threshold value to the gateway, and for causing the gateway to use the updated flow control threshold value to exercise flow-limiting control over the access terminals.

In some embodiments, a storage medium is configured to store the program code for the gateway to perform a processing operation on the access requests. The processing operations can include a protocol conversion processing, a parameter conversion processing, an access control processing, and a flow-limiting control processing.

In the aforesaid embodiments, the description of each embodiment has its respective emphasis, and parts of an embodiment are not described in detail. One may refer to other embodiments for the relevant descriptions.

Please understand that the disclosed technical content of several embodiments described herein may be realized in other manners or configurations. The device embodiments described above are merely illustrative. For example, the division into said units is merely a division by logical function. When actually implemented, there may be other forms of division. For example, multiple units or components may be combined or integrated into another system, or some features might be omitted or not executed. In addition, the interposed couplings or direct couplings or communication connections that are displayed or discussed may be indirect couplings or communication links that pass through some interfaces, units, or modules. They may be electrical or may take another form.

The units described as separate components may or may not be physically separate, and components displayed as units may or may not be physical units. They can be located in one place, or they can be distributed across multiple network units. The embodiment schemes of the present embodiments can be realized by selecting part or all of the units in accordance with actual need.

Furthermore, the functional units in the various embodiments can be integrated into one processing unit, or each unit can have an independent physical existence, or two or more units can be integrated into a single unit. The aforesaid integrated units may also take the form of hardware, and they may take the form of software function units.

If said integrated units are realized in the form of software functional units and are sold or used as separate products, they may be stored on computer-readable storage media. Based on such an understanding, the technical scheme of the present invention, whether intrinsically or with respect to portions that contribute to the prior art, or with respect to all or part of the technical scheme, is realizable in the form of software products. These computer software products can be stored on storage media (such as ROM/RAM, magnetic disks, and optical disks) and include a certain number of commands used to cause a piece of terminal equipment (which could be a mobile phone, a computer, a server, or network equipment) to execute the methods described in the embodiments of the present invention. The storage medium described above encompasses: USB flash drive, mobile hard drive, read-only memory (ROM), random access memory (RAM), portable hard drives, magnetic disks, or optical disks, or various other media that can store program code.

Figure 14:
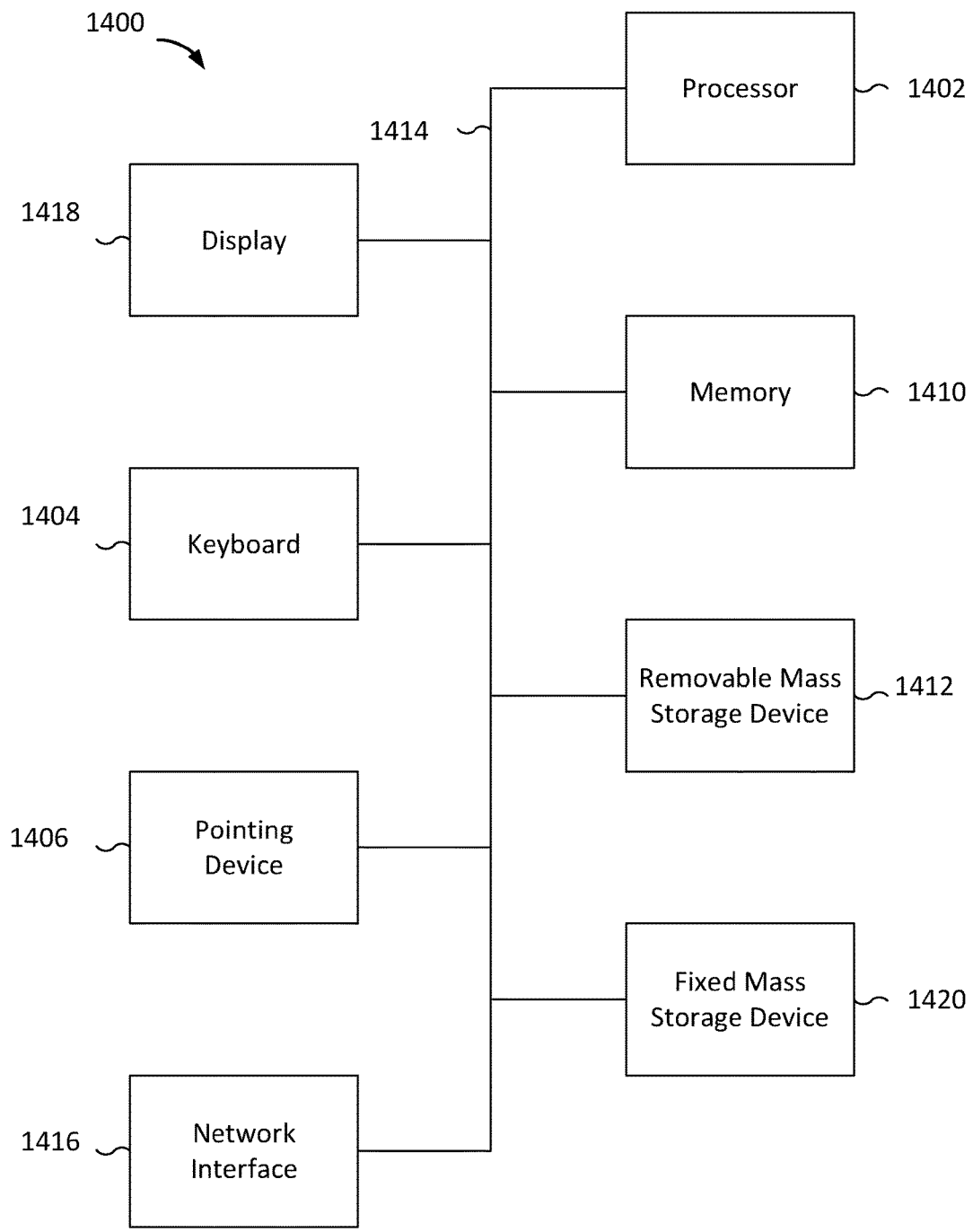
FIG. 14 is a functional diagram of a computer system for a flow control system according to various embodiments of the present application.

FIG. 14 is a functional diagram of a computer system for a flow control system according to various embodiments of the present application.

Referring to FIG. 14, a computer system 1400 for controlling flow is provided. As will be apparent, other computer system architectures and configurations can be used to control flow. Computer system 1400, which includes various subsystems as described below, includes at least one microprocessor subsystem (also referred to as a processor or a central processing unit (CPU)) 1402. For example, processor 1402 can be implemented by a single-chip processor or by multiple processors. In some embodiments, processor 1402 is a general purpose digital processor that controls the operation of the computer system 1400. Using instructions retrieved from memory 1410, the processor 1402 controls the reception and manipulation of input data, and the output and display of data on output devices (e.g., display 1418).

Processor 1402 is coupled bi-directionally with memory 1410, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 1402. Also as is well known in the art, primary storage typically includes basic operating instructions, program code, data, and objects used by the processor 1402 to perform its functions (e.g., programmed instructions). For example, memory 1410 can include any suitable computer-readable storage media, described below, depending on whether, for example, data access needs to be bi-directional or uni-directional. For example, processor 1402 can also directly and very rapidly retrieve and store frequently needed data in a cache memory (not shown). The memory can be a non-transitory computer-readable storage medium.

A removable mass storage device 1412 provides additional data storage capacity for the computer system 1400, and is coupled either bi-directionally (read/write) or uni-directionally (read only) to processor 1402. For example, storage 1412 can also include computer-readable media such as magnetic tape, flash memory, PC-CARDS, portable mass storage devices, holographic storage devices, and other storage devices. A fixed mass storage 1420 can also, for example, provide additional data storage capacity. The most common example of mass storage 1420 is a hard disk drive. Mass storage device 1412 and fixed mass storage 1420 generally store additional programming instructions, data, and the like that typically are not in active use by the processor 1402. It will be appreciated that the information retained within mass storage device 1412 and fixed mass storage 1420 can be incorporated, if needed, in standard fashion as part of memory 1410 (e.g., RAM) as virtual memory.

In addition to providing processor 1402 access to storage subsystems, bus 1414 can also be used to provide access to other subsystems and devices. As shown, these can include a display monitor 1418, a network interface 1416, a keyboard 1404, and a pointing device 1406, as well as an auxiliary input/output device interface, a sound card, speakers, and other subsystems as needed. For example, the pointing device 1406 can be a mouse, stylus, track ball, or tablet, and is useful for interacting with a graphical user interface.

The network interface 1416 allows processor 1402 to be coupled to another computer, computer network, or telecommunications network using a network connection as shown. For example, through the network interface 1416, the processor 1402 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 1402 can be used to connect the computer system 1400 to an external network and transfer data according to standard protocols. For example, various process embodiments disclosed herein can be executed on processor 1402, or can be performed across a network such as the Internet, intranet networks, or local area networks, in conjunction with a remote processor that shares a portion of the processing. Additional mass storage devices (not shown) can also be connected to processor 1402 through network interface 1416.

An auxiliary I/O device interface (not shown) can be used in conjunction with computer system 1400. The auxiliary I/O device interface can include general and customized interfaces that allow the processor 1402 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 14 is but an example of a computer system suitable for use with the various embodiments disclosed herein. Other computer systems suitable for such use can include additional or fewer subsystems. In addition, bus 1414 is illustrative of any interconnection scheme serving to link the subsystems. Other computer architectures having different configurations of subsystems can also be utilized.

The modules described above can be implemented as software components executing on one or more general purpose processors, as hardware such as programmable logic devices, and/or Application Specific Integrated Circuits designed to perform certain functions or a combination thereof. In some embodiments, the modules can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules may be implemented on a single device or distributed across multiple devices. The functions of the modules may be merged into one another or further split into multiple sub-modules.

The methods or algorithmic steps described in light of the embodiments disclosed herein can be implemented using hardware, processor-executed software modules, or combinations of both. Software modules can be installed in random-access memory (RAM), memory, read-only memory (ROM), electrically programmable ROM, electrically erasable programmable ROM, registers, hard drives, removable disks, CD-ROM, or any other forms of storage media known in the technical field.

The description above is only a specific means of implementing the present invention. It should be pointed out that persons with ordinary skill in the art can, without departing from the principles of the present invention, also produce a number of improvements and embellishments, and that such improvements and embellishments should also be regarded as falling within the scope of protection of the present invention.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A method, comprising:
 detecting one or more access requests communicated from one or more access terminals, the one or more access requests associated with accessing a service application system;

obtaining flow-limiting condition data;
determining a new flow control threshold value based at least in part on the flow-limiting condition data;
updating a current flow control threshold value based at least in part on the new flow control threshold value; and
controlling traffic flow associated with accessing the service application system based at least in part on the current flow control threshold value, the controlling of the traffic flow comprises:
  determining whether a traffic measurement has reached the current flow control threshold value,
  determining whether to permit a subsequent access request for accessing the service application system based at least in part on whether the traffic measurement has reached the current flow control threshold value, and
  in response to determining not to permit the subsequent access request:
    queuing one or more subsequent access requests for accessing the service application system;
    denying the one or more access requests; or
    both.

2. The method of claim 1, wherein the flow-limiting condition data comprises: the current flow control threshold value, and one or more of a historical flow control data associated with the service application system and a load data associated with the service application system.

3. The method of claim 1, wherein:
the flow-limiting condition data comprises: the current flow control threshold value, and one or more of a historical flow control data associated with the service application system, and a load data associated with the service application system;
the historical flow control data comprises one or more of a flow-limiting count and a flow-limiting frequency; and
the load data comprises one or more of a processing value and a CPU utilization ratio.

4. The method of claim 1, wherein:
the flow-limiting condition data comprises: the current flow control threshold value, and one or more of a historical flow control data associated with the service application system and a load data associated with the service application system;
the historical flow control data comprises one or more of a flow-limiting count and a flow-limiting frequency,
the load data comprises one or more of a processing value and a CPU utilization ratio;
the current flow control threshold value comprises one or more of an access user flow control threshold value, an access terminal address flow control threshold value, and an API flow control threshold value; and
determining the new flow control threshold value based at least in part on the flow-limiting condition data comprises:
  determining whether the flow-limiting count exceeds a predetermined count and/or said flow-limiting frequency exceeds a predetermined frequency value; and
  in response to a determination that the flow-limiting count exceeds the predetermined count, and/or a determination that the flow-limiting frequency exceeds the predetermined frequency value, lowering the current flow control threshold value to a first predetermined flow control threshold value.

5. The method of claim 4, wherein:
the flow-limiting condition data comprises a plurality of preset flow-limiting control priority levels; and
determining the new flow control threshold value based at least in part on the flow-limiting condition data comprises:
  determining whether to adjust the current flow control threshold value to the first predetermined flow control threshold value based at least in part on the historical flow control data;
  determining whether to adjust current flow control threshold value to a second predetermined flow control threshold value or a third predetermined flow control threshold value based at least in part on the service application system load data; and
  in response to determining to adjust the current flow control threshold value to the first predetermined flow control threshold value based at least in part on the historical flow control data, and determining to adjust current flow control threshold value to the second predetermined flow control threshold value or a third predetermined flow control threshold value based at least in part on the service application system load data, and the plurality of priority levels comprise a priority level corresponding to historical flow control data that is higher than a priority level corresponding to load data, selecting the first predetermined flow control threshold value as the new flow control threshold value.

6. The method of claim 5, wherein in response to a determination that the priority level corresponding to the load data is higher than the priority level corresponding to the historical flow control data, selecting the second predetermined flow control threshold value or the third predetermined flow control threshold value as the new flow control threshold value.

7. The method of claim 5, further comprising:
in response to a determination that the first predetermined flow control threshold value is greater than the second predetermined flow control threshold value, selecting the first predetermined flow control threshold value as the new flow control threshold value; and
otherwise, selecting the second predetermined flow control threshold value or the third predetermined flow control threshold value as the new flow control threshold value.

8. The method of claim 1, wherein:
the flow-limiting condition data comprises: the current flow control threshold value, and one or more of a historical flow control data associated with the service application system and a load data associated with the service application system;
the historical flow control data comprises one or more of a flow-limiting count and a flow-limiting frequency;
the load data comprises one or more of a processing value and a CPU utilization ratio;
the service application system comprises multiple business servers; and
the determining the new flow control threshold value based at least in part on flow-limiting condition data comprises:
  comparing a task processing value of business servers with a predetermined quantity within the service application system, and/or comparing the CPU utilization ratio with one or more predetermined values;
  in response to a determination that the task processing value of business servers exceeding the predetermined quantity within the service application system is greater than or equal to a first predetermined value, and/or the CPU utilization ratio is greater than or equal to a second predetermined value, lowering said current flow control threshold value to a second predetermined flow control threshold value; and in response to a determination that the task processing value of business servers exceeding the predetermined quantity within the service application system is less than or equal to a third predetermined value, or the CPU utilization ratio is less than or equal to a fourth predetermined value, raising said current flow control threshold value to a third predetermined flow control threshold value.

9. The method of claim 8, wherein:
the flow-limiting condition data comprises a plurality of preset flow-limiting control priority levels; and
determining the new flow control threshold value based at least in part on the flow-limiting condition data comprises:
  determining whether to adjust the current flow control threshold value to a first predetermined flow control threshold value based at least in part on the historical flow control data;
  determining whether to adjust current flow control threshold value to the second predetermined flow control threshold value or the third predetermined flow control threshold value based at least in part on the service application system load data; and
  in response to a determination that the current flow control threshold value is to be adjusted to the first predetermined flow control threshold value based at least in part on the historical flow control data, and that the current flow control threshold value is to be adjusted to the second predetermined flow control threshold value or the third predetermined flow control threshold value based at least in part on the service application system load data, and the plurality of priority levels comprise a priority level corresponding to the historical flow control data that is higher than a priority level corresponding to the load data, selecting the first predetermined flow control threshold value as the new flow control threshold value.

10. The method of claim 9, wherein in response to a determination that the priority level corresponding to the load data is higher than the priority level corresponding to the historical flow control data, selecting the second predetermined flow control threshold value or the third predetermined flow control threshold value as the new flow control threshold value.

11. The method of claim 9, further comprising:
in response to a determination that the first predetermined flow control threshold value is greater than the second predetermined flow control threshold value, selecting the first predetermined flow control threshold value as the new flow control threshold value; and
in response to a determination that the first predetermined flow control threshold value is not greater than the second predetermined flow control threshold value, selecting the second predetermined flow control threshold value or the third predetermined flow control threshold value as the new flow control threshold value.

12. The method of claim 1, wherein the controlling the traffic flow further comprises:
obtaining the one or more access requests from the one or more access terminals via a gateway, wherein the one or more access requests are sent by the one or more access terminals to the service application system, and wherein a flow-limiting control is performed by the gateway in connection with the access requests based at least in part on the current flow control threshold value,
wherein the one or more access requests and the flow-limiting condition data obtained in connection with performing the flow-limiting control are recorded in a logging system, wherein the logging system stores historical flow control data; and
wherein the historical flow control data is communicated to an analysis system in the event that the one or more access requests are recorded in the logging system.

13. The method of claim 12, further comprising:
providing an updated flow control threshold value to the gateway, wherein the gateway uses the updated flow control threshold value in connection with performing flow-limiting control over at least one of the one or more access terminals.

14. The method of claim 12, wherein the gateway performs one or more of: a protocol conversion processing, a parameter conversion processing, an access control processing, and a flow-limiting control processing in relation to the one or more access requests.

15. A computer program product, the computer program product being embodied in a non-transitory computer readable storage medium and comprising computer instructions for:
  detecting one or more access requests communicated from one or more access terminals, the one or more access requests associated with accessing a service application system;
  obtaining flow-limiting condition data;
  determining a new flow control threshold value based at least in part on the flow-limiting condition data;
  updating a current flow control threshold value based at least in part on the new flow control threshold value; and
  controlling traffic flow associated with accessing the service application system based at least in part on the current flow control threshold value, the controlling of the traffic flow comprises:
    determining whether a traffic measurement has reached the current flow control threshold value,
    determining whether to permit a subsequent access request for accessing the service application system based at least in part on whether the traffic measurement has reached the current flow control threshold value, and
    in response to determining not to permit the subsequent access request:
      queuing one or more subsequent access requests for accessing the service application system;
      denying the one or more access requests; or
      both.

16. A system, comprising:
an analysis system terminal configured to:
  detect one or more access requests communicated from one or more access terminals, the one or more access requests associated with accessing a service application system;
  obtain flow-limiting condition data;
  determine a new flow control threshold value based at least in part on the flow-limiting condition data; and
  update a current flow control threshold value based at least in part on the new flow control threshold value; and a gateway that receives the one or more access requests communicated to the service application system by the one or more access terminals, the gateway configured to:
control traffic flow associated with accessing the service application system based at least in part on the current flow control threshold value, to control the traffic flow comprising:
determine whether a traffic measurement has reached the current flow control threshold value,
determine whether to permit a subsequent access request for accessing the service application system based at least in part on whether the traffic measurement has reached the current flow control threshold value, and
in response to determining not to permit the subsequent access request:
queue one or more subsequent access requests for accessing the service application system;
deny the one or more access requests; or
both.

17. The system of claim 16, wherein the flow-limiting condition data comprises: the current flow control threshold value, and one or more of a historical flow control data associated with the service application system and a load data associated with the service application system.

18. The system of 19, wherein the gateway is configured to perform one or more of a protocol conversion processing, a parameter conversion processing, an access control processing, and a flow-limiting control processing in relation to the one or more access requests.

19. The system of 19, wherein the gateway is configured to perform a flow-limiting control in connection with the one or more access requests based at least in part on the current flow control threshold value.

20. A method, comprising:
detecting one or more access requests communicated from one or more access terminals, the one or more access requests associated with accessing a service application system;
obtaining flow-limiting condition data;
determining a new flow control threshold value based at least in part on the flow-limiting condition data; and
updating a current flow control threshold value based at least in part on the new flow control threshold value,
wherein:
the flow-limiting condition data comprises: the current flow control threshold value, and one or more of a historical flow control data associated with the service application system and a load data associated with the service application system,
the historical flow control data comprises one or more of a flow-limiting count and a flow-limiting frequency,
the load data comprises one or more of a processing value and a CPU utilization ratio,
the current flow control threshold value comprises one or more of an access user flow control threshold value, an access terminal address flow control threshold value, and an API flow control threshold value, and determining the new flow control threshold value based at least in part on the flow-limiting condition data comprises:
determining whether the flow-limiting count exceeds a predetermined count and/or said flow-limiting frequency exceeds a predetermined frequency value, and
in response to a determination that the flow-limiting count exceeds the predetermined count, and/or a determination that the flow-limiting frequency exceeds the predetermined frequency value, lowering the current flow control threshold value to a first predetermined flow control threshold value.

21. A method, comprising:
detecting one or more access requests communicated from one or more access terminals, the one or more access requests associated with accessing a service application system;
obtaining flow-limiting condition data;
determining a new flow control threshold value based at least in part on the flow-limiting condition data; and
updating a current flow control threshold value based at least in part on the new flow control threshold value,
wherein:
the flow-limiting condition data comprises: the current flow control threshold value, and one or more of a historical flow control data associated with the service application system and a load data associated with the service application system,
the historical flow control data comprises one or more of a flow-limiting count and a flow-limiting frequency,
the load data comprises one or more of a processing value and a CPU utilization ratio,
the service application system comprises multiple business servers,
the determining the new flow control threshold value based at least in part on flow-limiting condition data comprises:
comparing a task processing value of business servers with a predetermined quantity within the service application system, and/or comparing the CPU utilization ratio with one or more predetermined values,
in response to a determination that the task processing value of business servers exceeding the predetermined quantity within the service application system is greater than or equal to a first predetermined value, and/or the CPU utilization ratio is greater than or equal to a second predetermined value, lowering said current flow control threshold value to a second predetermined flow control threshold value; and
in response to a determination that the task processing value of business servers exceeding the predetermined quantity within the service application system is less than or equal to a third predetermined value, or the CPU utilization ratio is less than or equal to a fourth predetermined value, raising said current flow control threshold value to a third predetermined flow control threshold value.

* * * * *